May 12, 1959    G. O. K. SCHNEIDER    2,886,656
ELECTRONIC SWITCHING TELEPHONE SYSTEM
Filed June 4, 1958    21 Sheets-Sheet 1

INVENTOR.
GERHARD O.K. SCHNEIDER
BY F. H. Henson
ATTORNEY

May 12, 1959 G. O. K. SCHNEIDER 2,886,656
ELECTRONIC SWITCHING TELEPHONE SYSTEM
Filed June 4, 1958 21 Sheets-Sheet 7

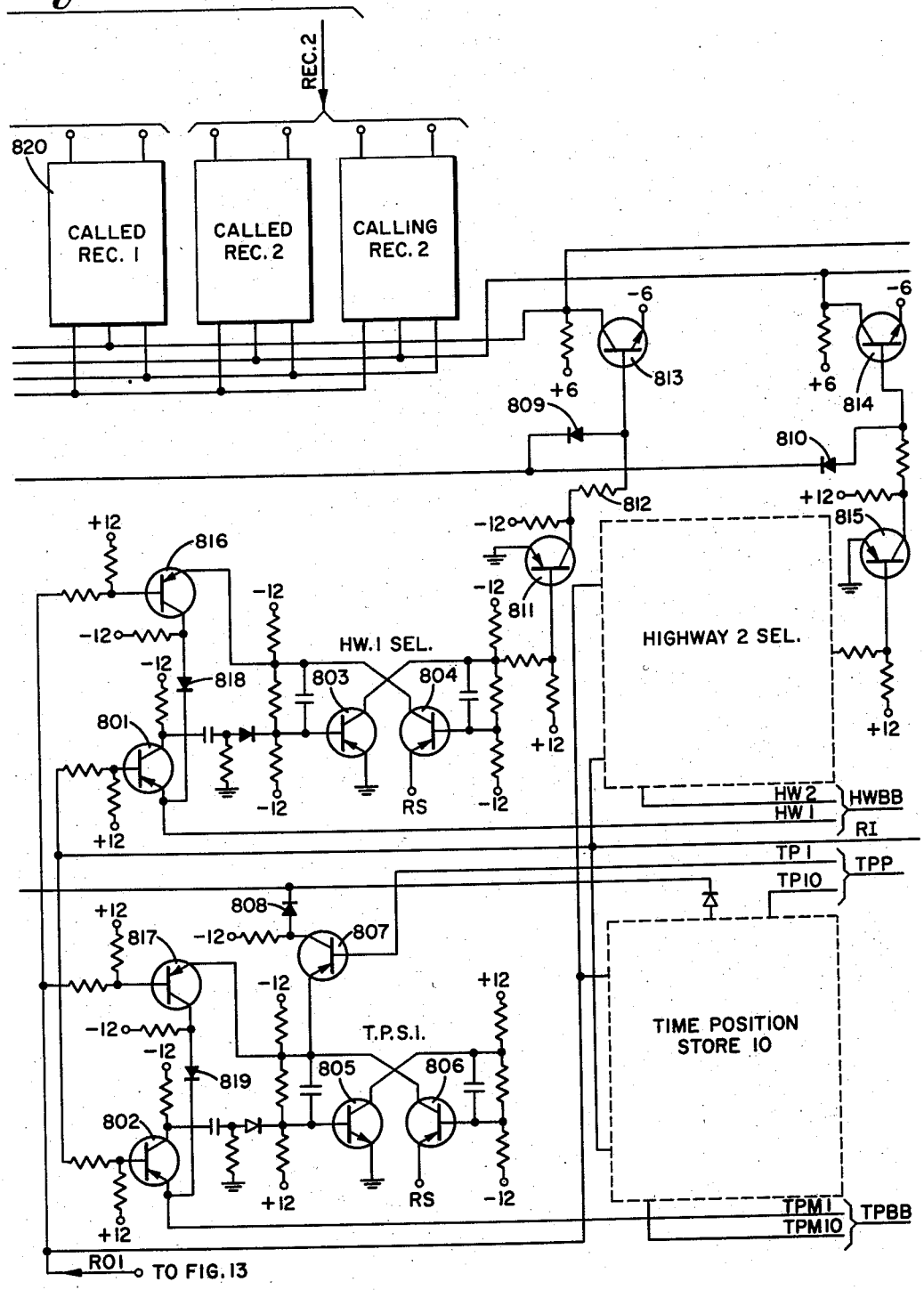
Fig. 8 — LINK CIRCUIT 1

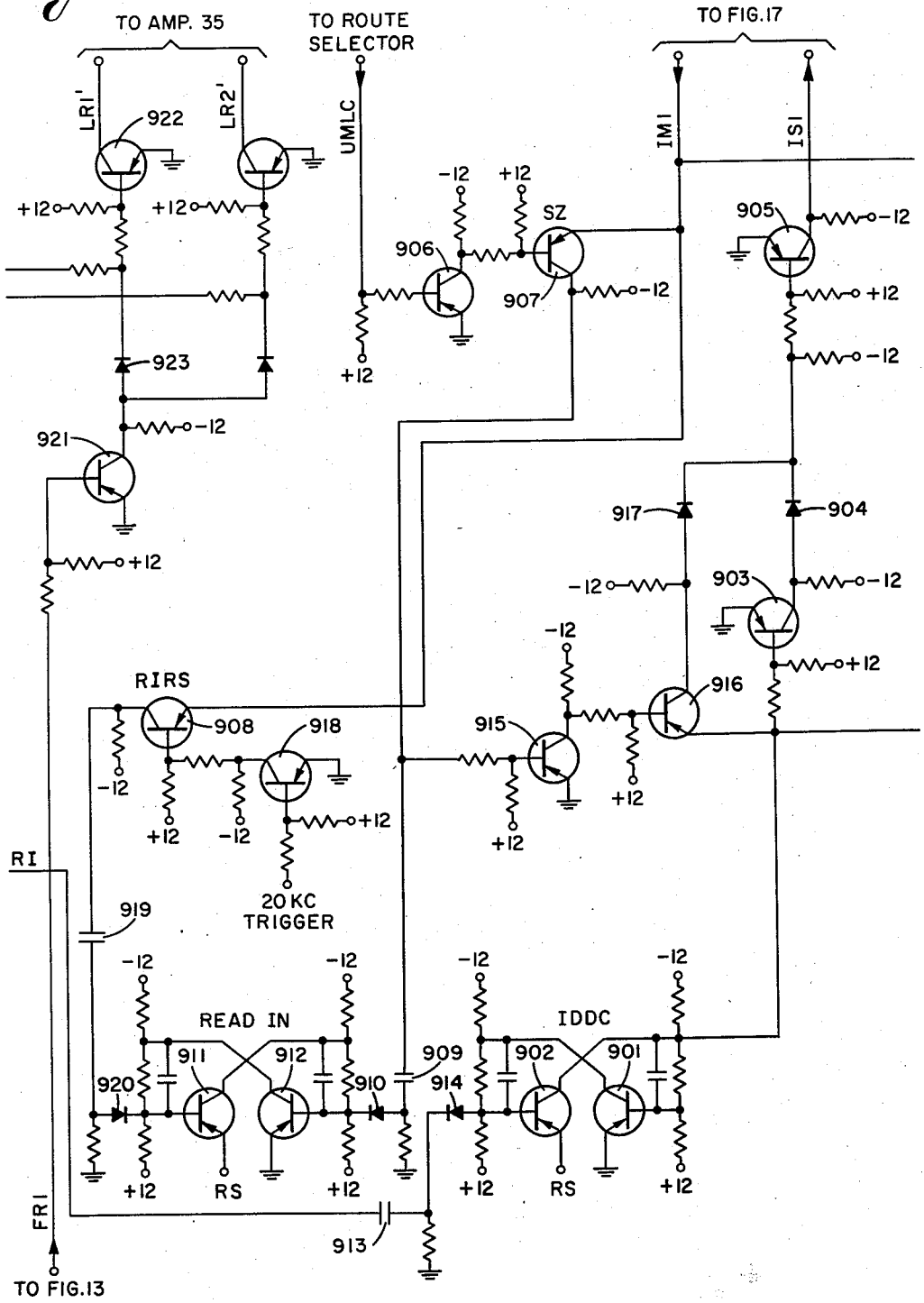

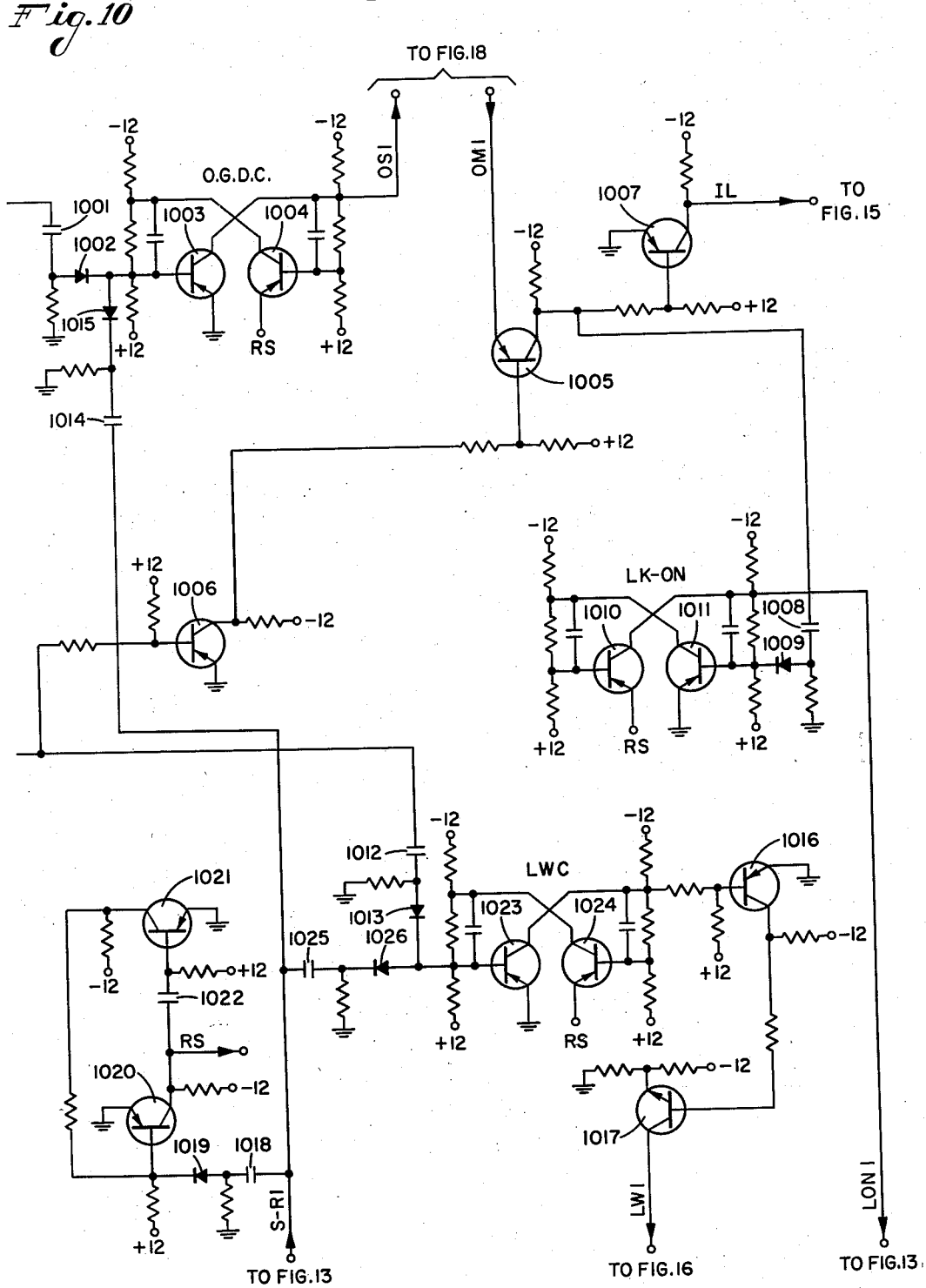

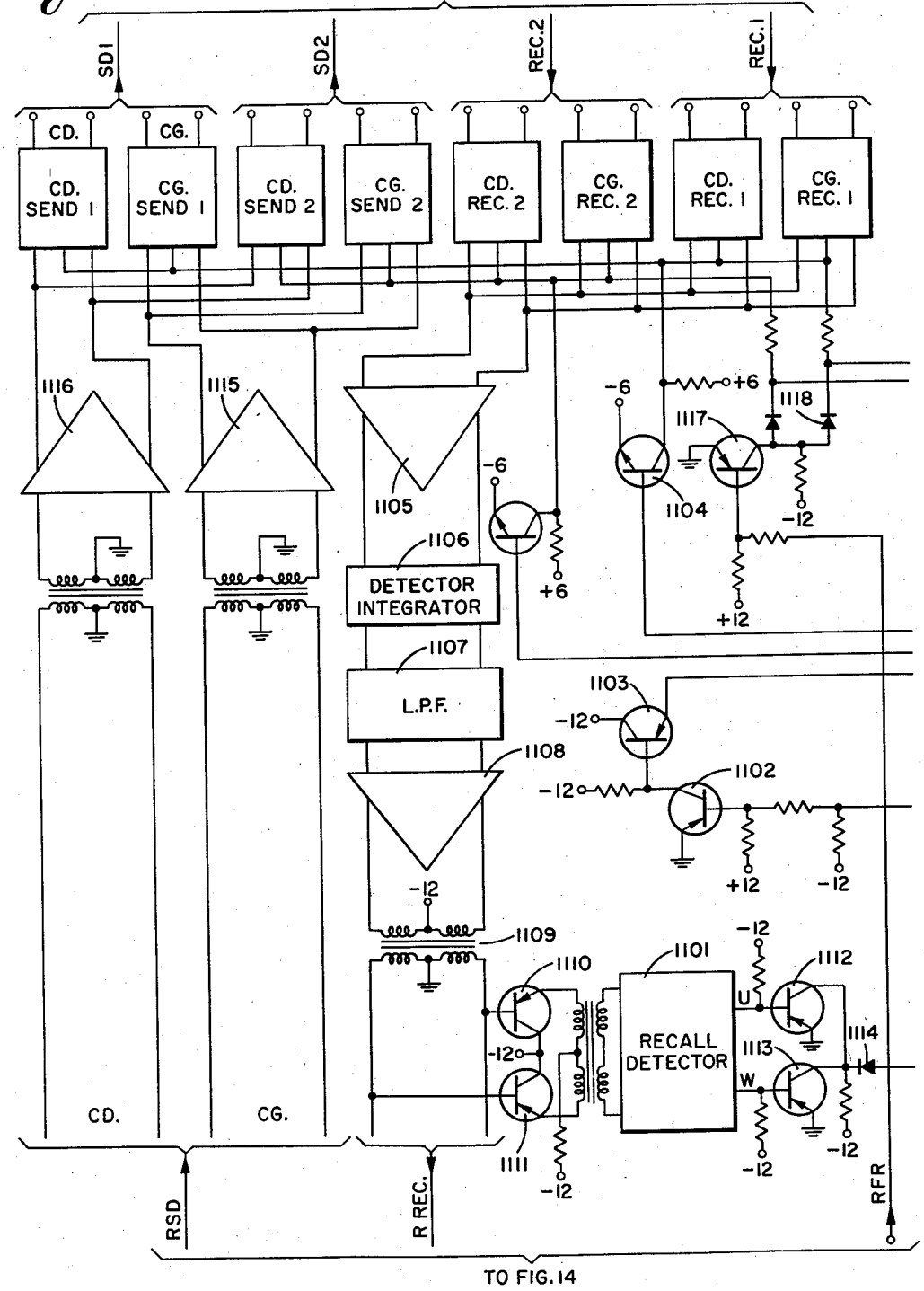
Fig. 11 — Recall Link Circuit

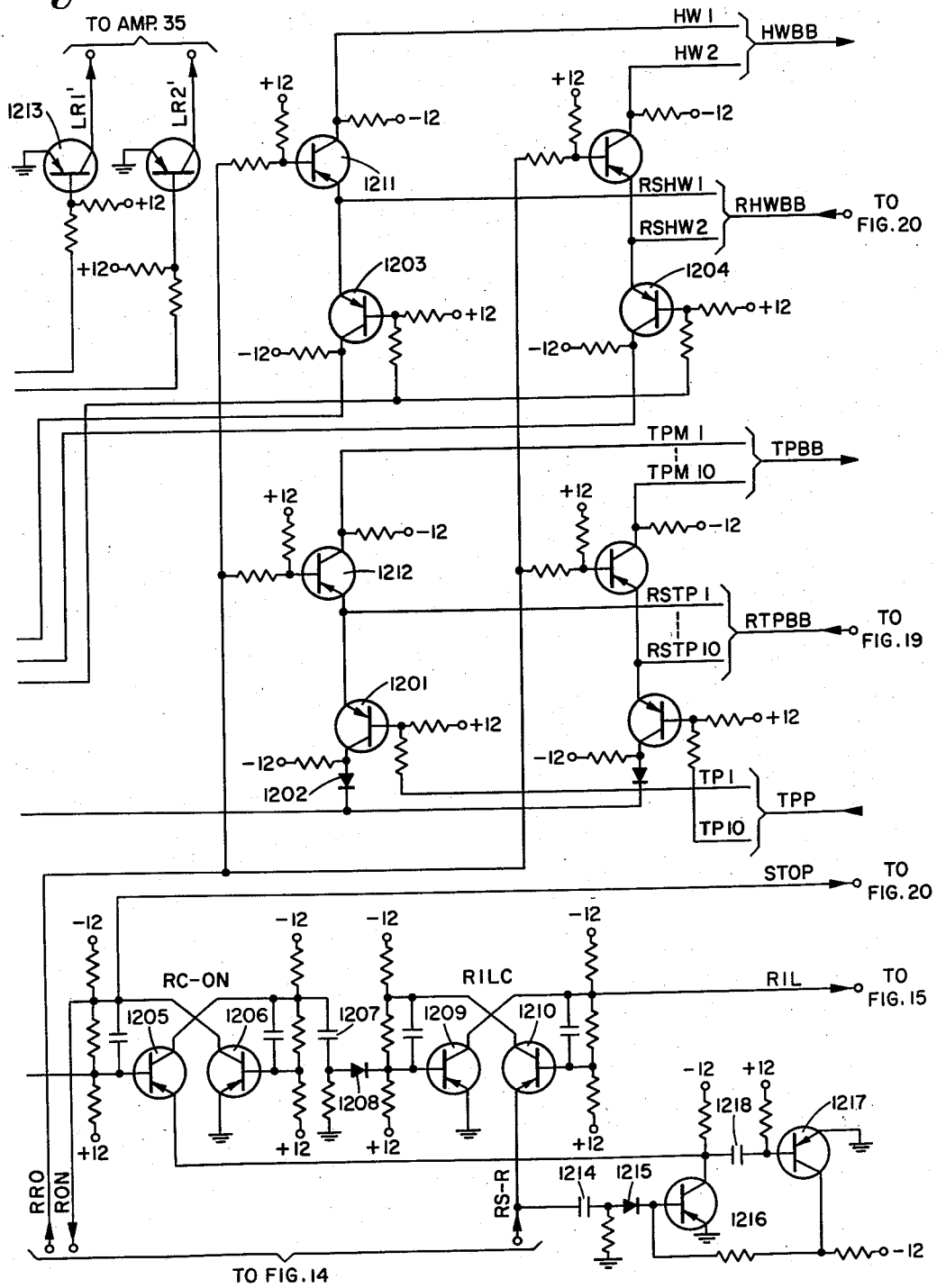

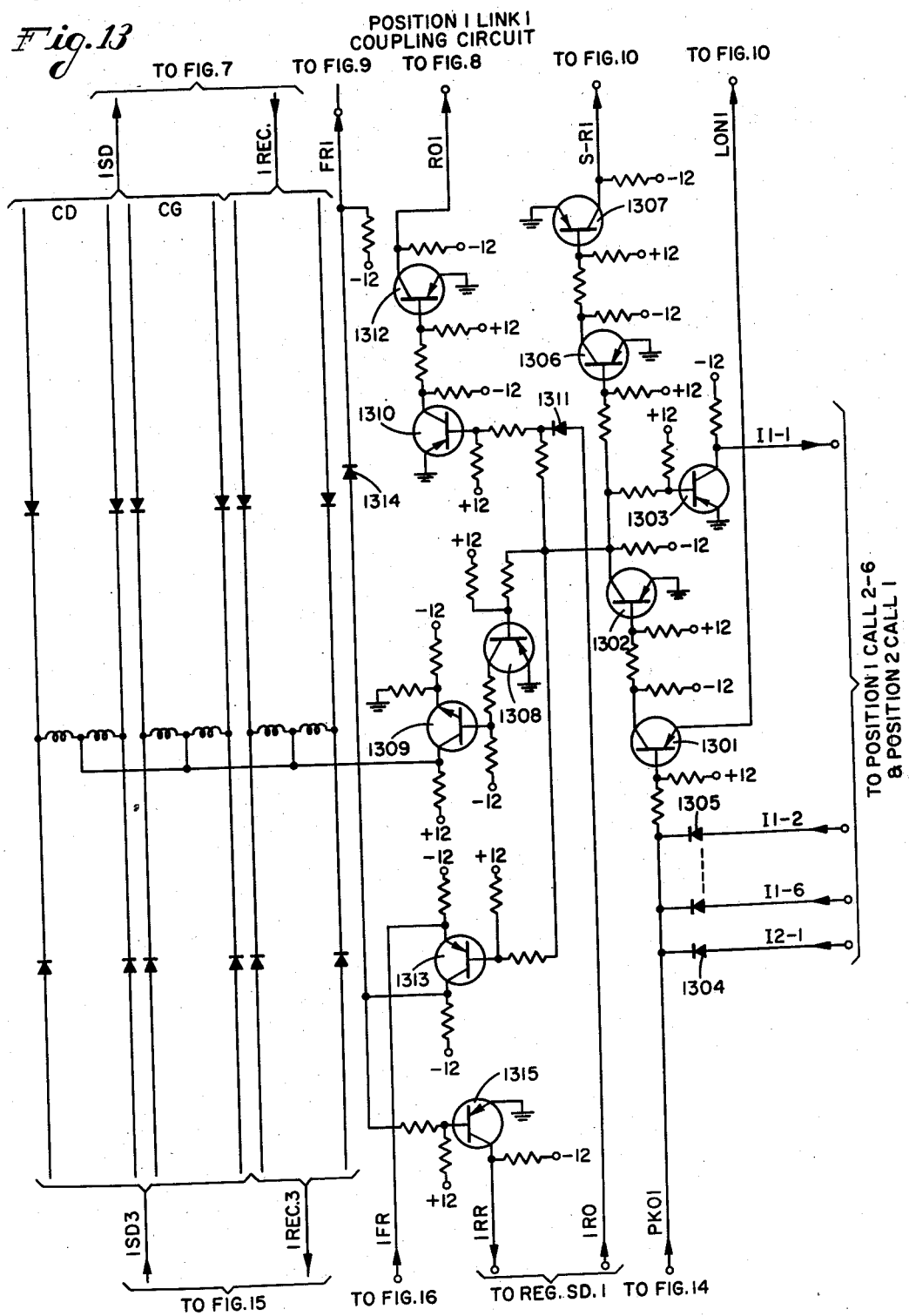

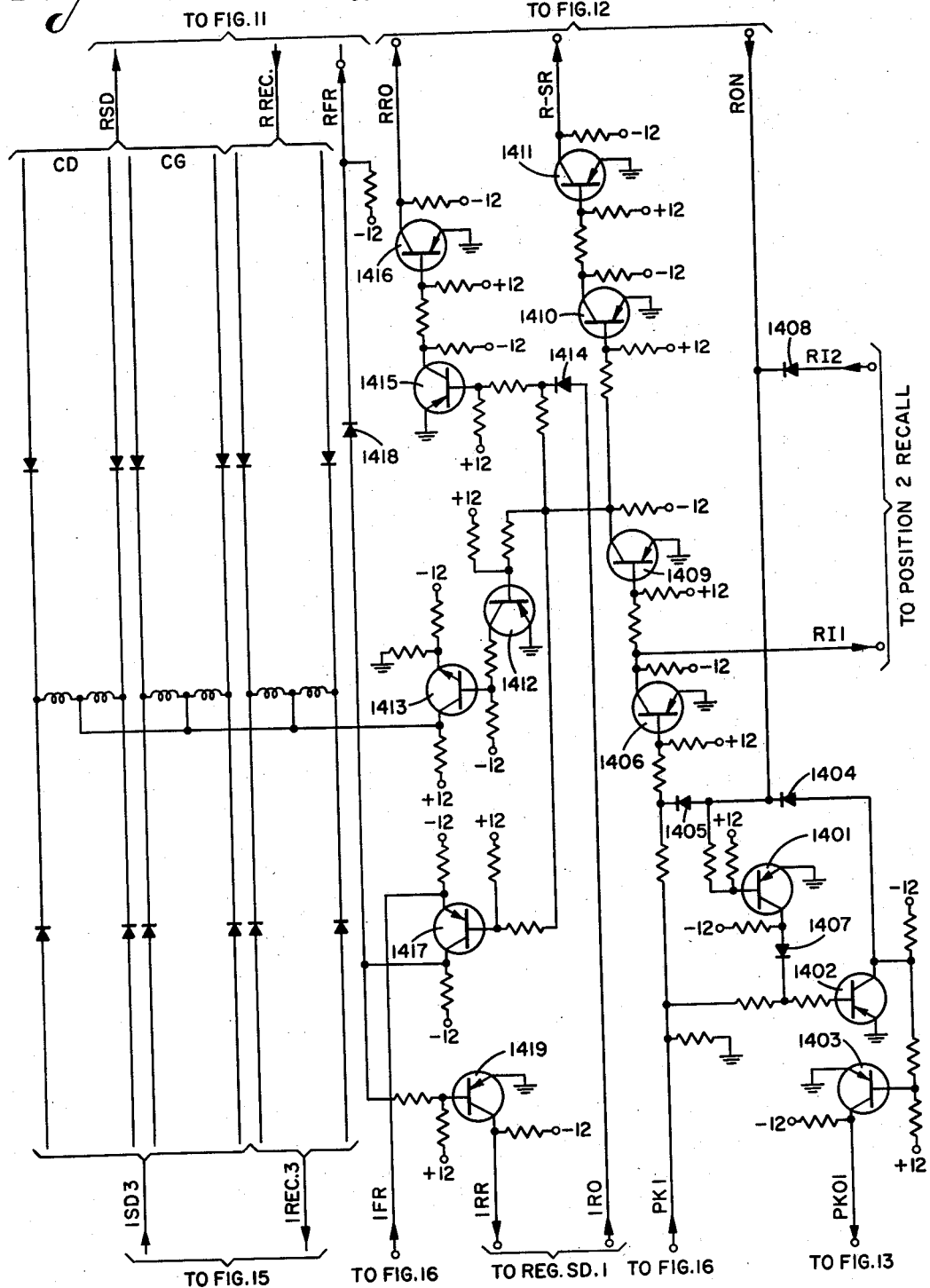

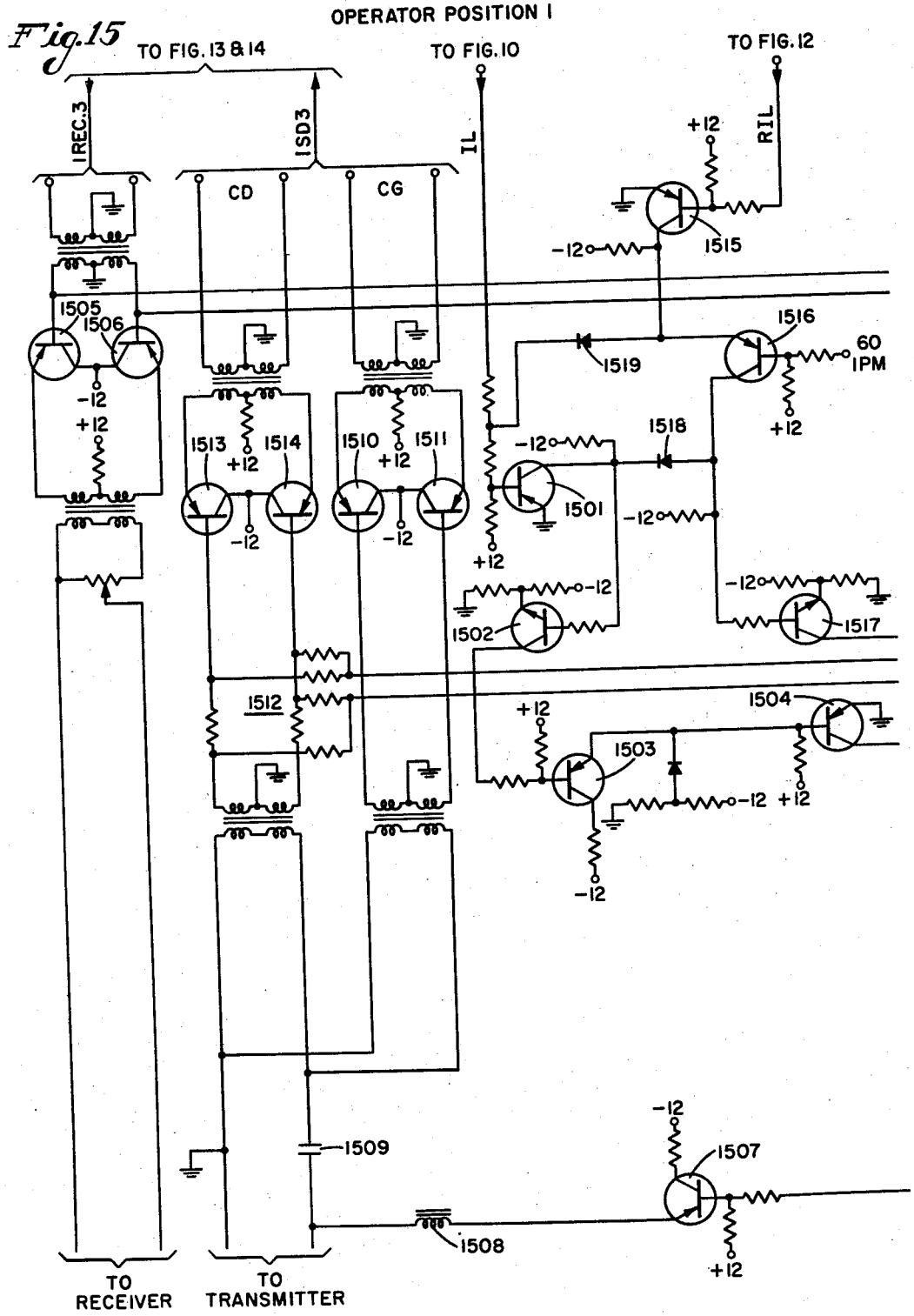

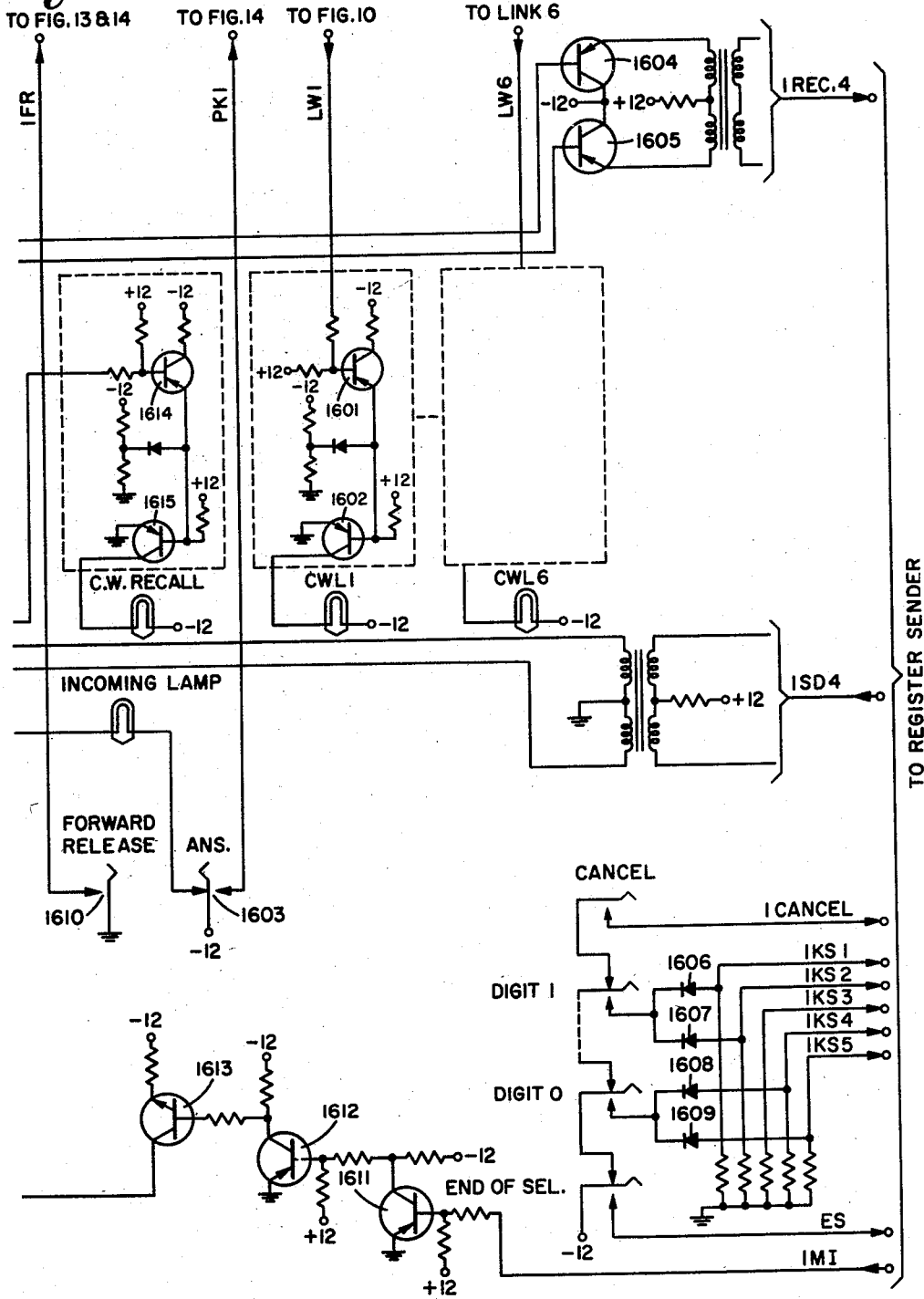

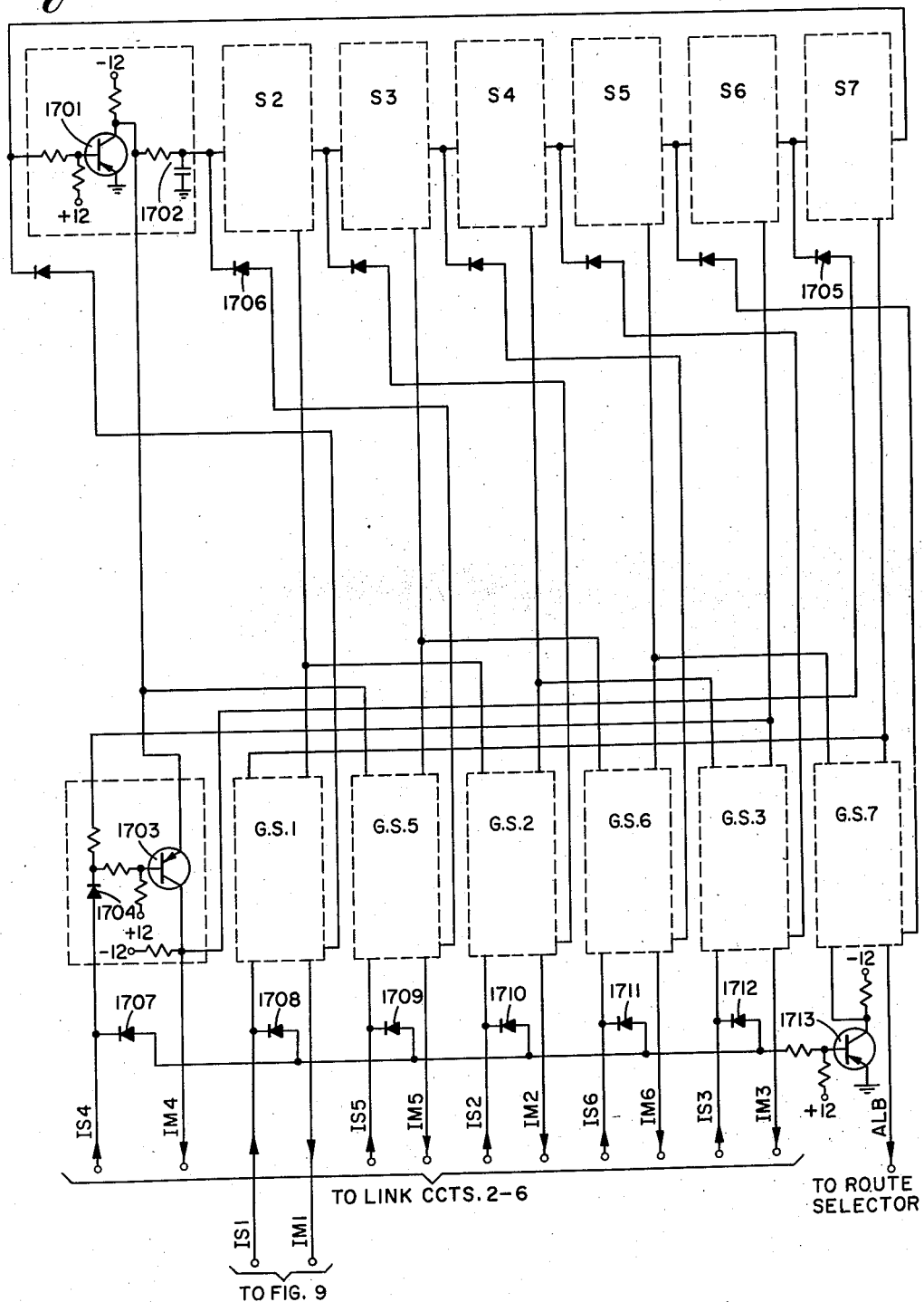

May 12, 1959  G. O. K. SCHNEIDER  2,886,656
ELECTRONIC SWITCHING TELEPHONE SYSTEM
Filed June 4, 1958  21 Sheets-Sheet 18
Fig.18  OUTGOING DISTRIBUTOR
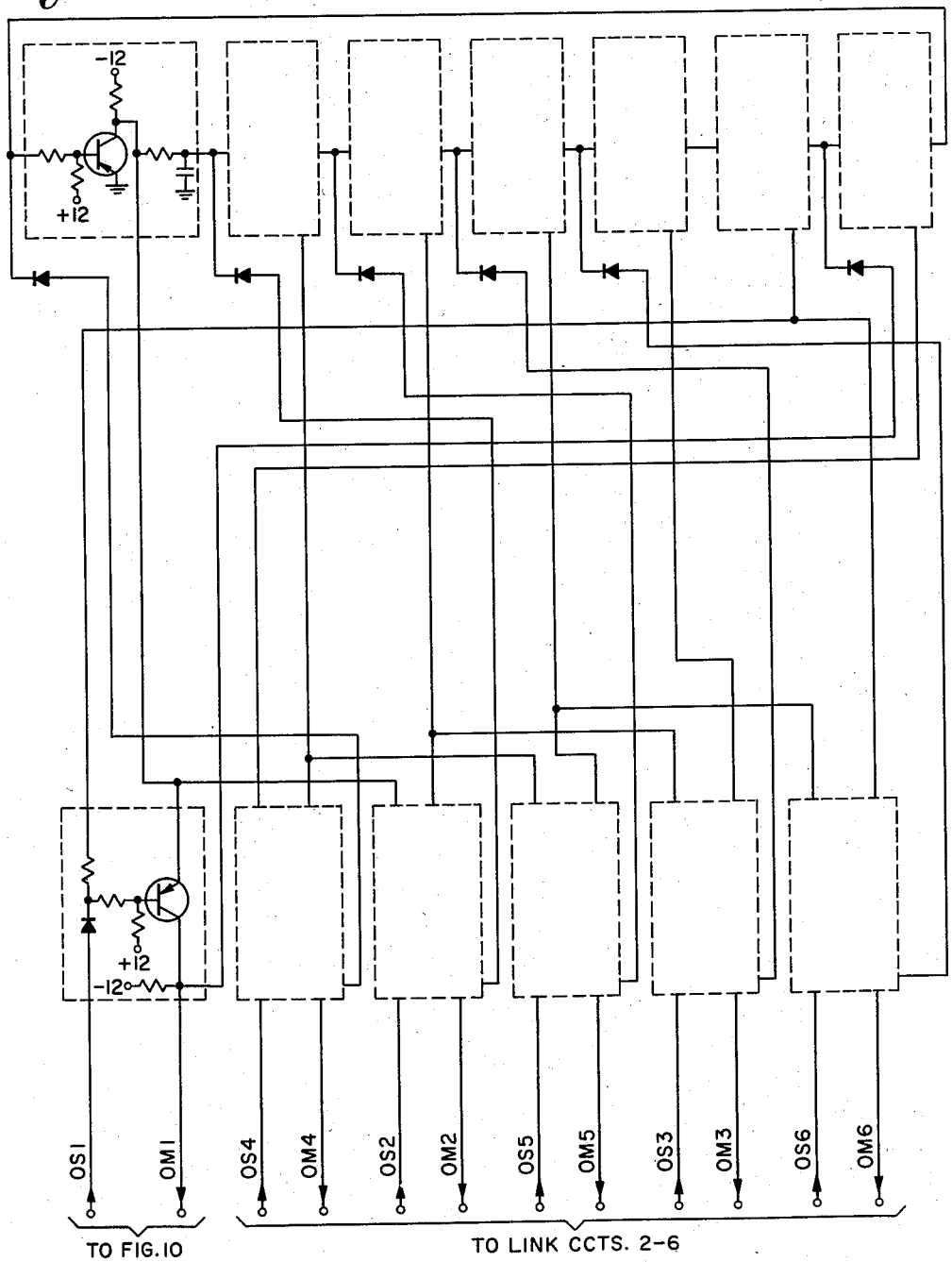

May 12, 1959  G. O. K. SCHNEIDER  2,886,656
ELECTRONIC SWITCHING TELEPHONE SYSTEM
Filed June 4, 1958  21 Sheets-Sheet 19
Fig.19  RECALL SCAN CONTROL
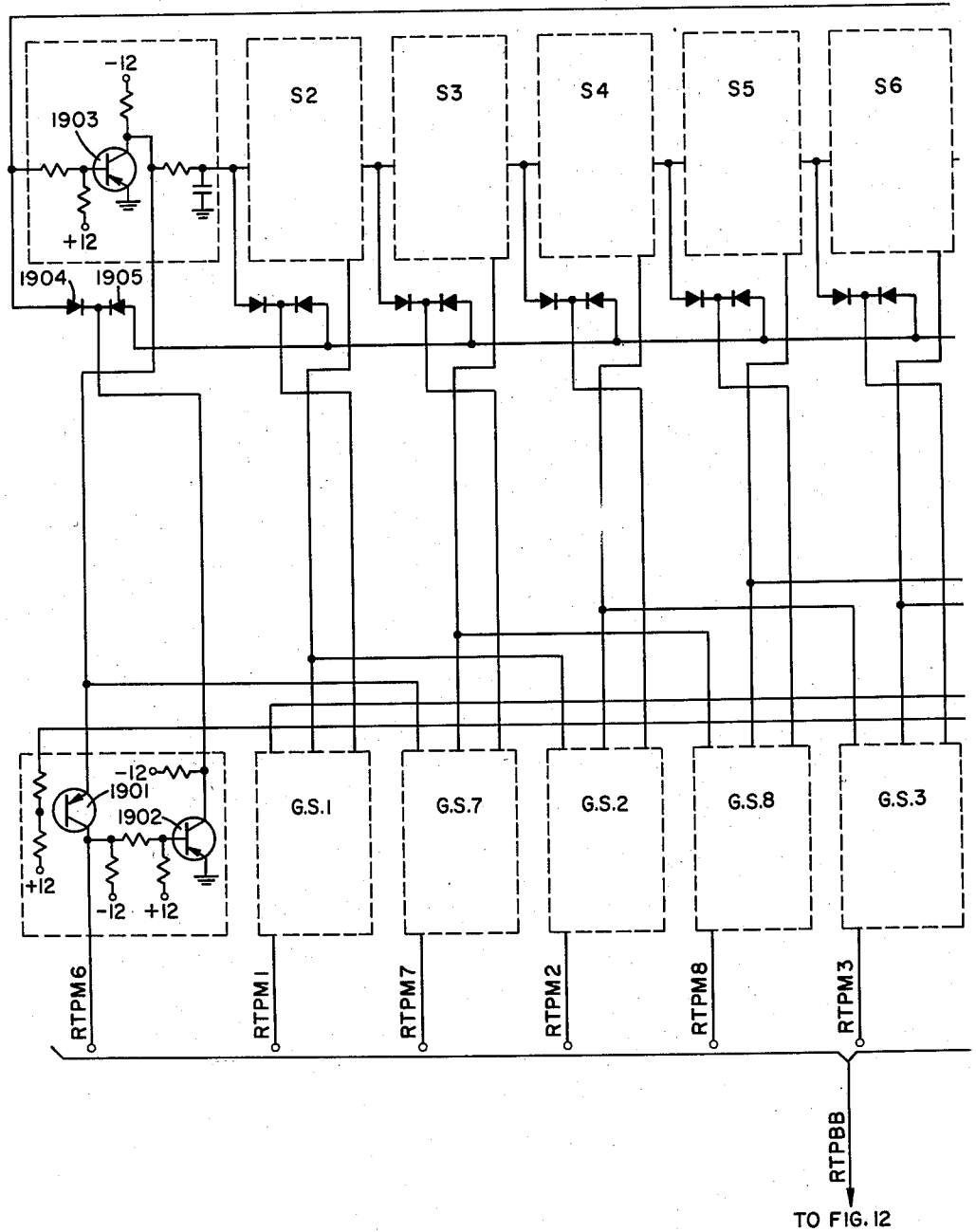

May 12, 1959     G. O. K. SCHNEIDER     2,886,656
ELECTRONIC SWITCHING TELEPHONE SYSTEM
Filed June 4, 1958     21 Sheets-Sheet 20
Fig. 20     RECALL SCAN CONTROL
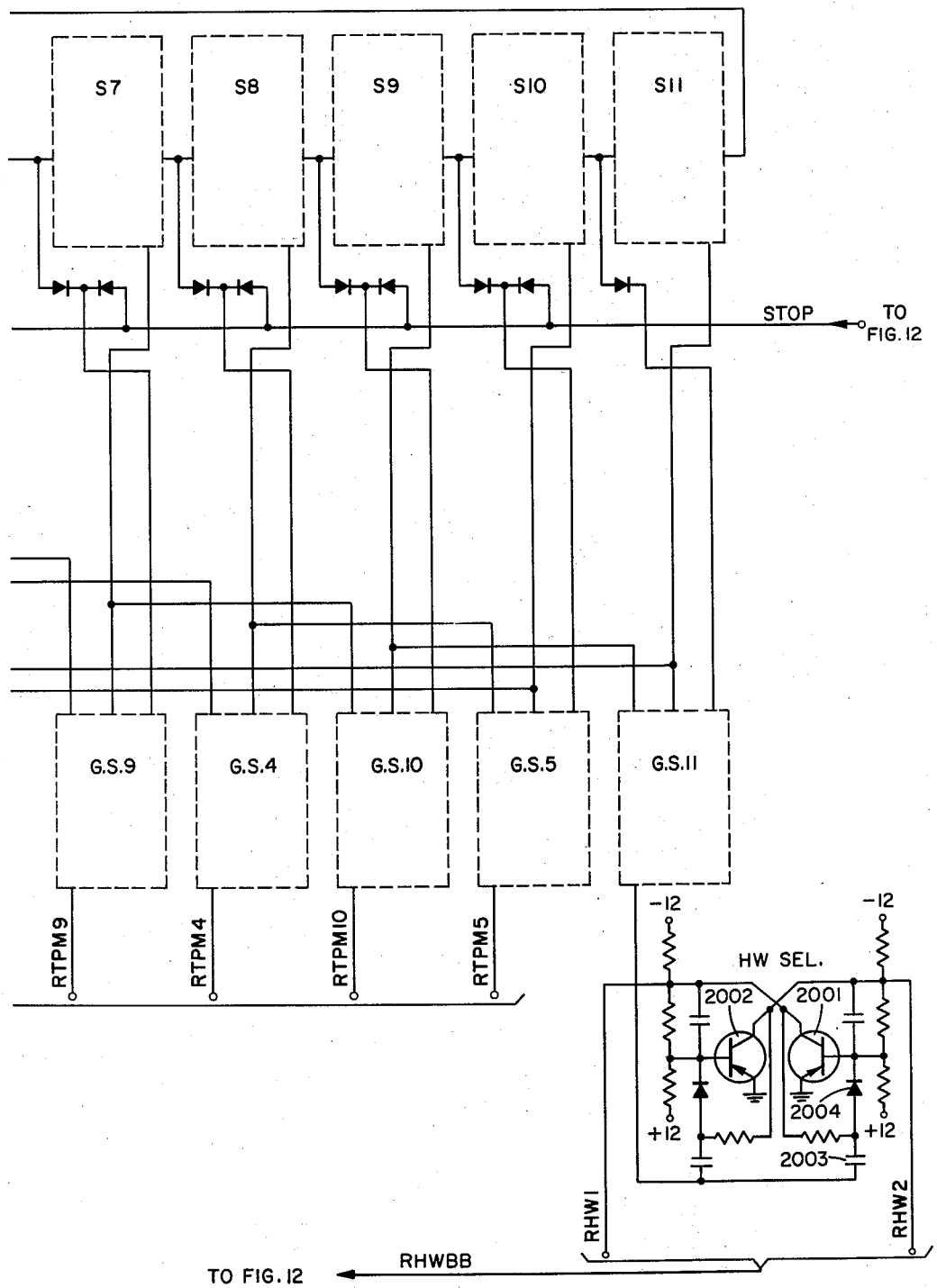

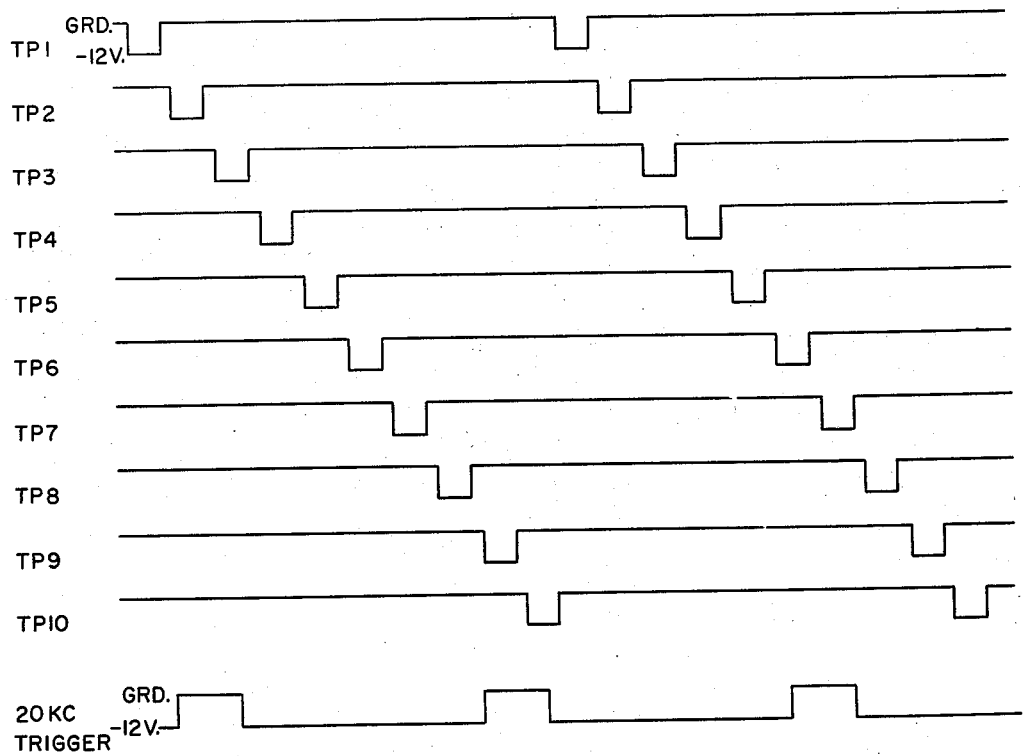
PULSE CHART

United States Patent Office 2,886,656
Patented May 12, 1959

2,886,656

ELECTRONIC SWITCHING TELEPHONE SYSTEM

Gerhard O. K. Schneider, Rochester, N.Y., assignor to General Dynamics Corporation, Rochester, N.Y., a corporation of Delaware Application June 4, 1958, Serial No. 739,724

15 Claims. (Cl. 179—27)

This invention relates in general to electronic switching telephone systems and, more particularly, to electronic switching telephone systems of the type in which certain calls incoming to an office are routed to an operator position in that office for answering and further extension. An electronic switching telephone system of this type is shown and described in copending application Serial No. 729,351, filed April 18, 1958, and assigned to the same assignee as the present invention.

In the system disclosed in the above-identified application, the lines and the operator or attendant link circuits are interconnected by a transmission highway network of the time division channel type and an individual channel on said network is assigned to each calling line. If a particular call is to be routed to an operator position, an idle one of the link circuits is controlled, by an incoming register and a route selector provided in the system, to seize the channel assigned to the line originating that call to thereby complete a connection between the calling line and that link circuit. Each link circuit has a key appearance at each operator position and a call on a particular link circuit is answered by operating the answer key corresponding to that link circuit at any one of the positions. In accordance with oral instructions received from the calling party over the calling line, the assigned channel, and the answered link circuit, the answering operator keys the number of the desired called line into a register sender at the answering position and the called line identified by said registration is then controlled to seize the channel assigned to the calling line to thereby complete a connection between the calling and called lines. Each link circuit provided in the system comprises a multifrequency receiver which is utilized to detect voice frequency recall or release signals appearing on the channel seized by that link circuit and to relay said supervisory signals to the operator position which answered the call on that link circuit. If a recall or release signal is detected by the multifrequency receiver in a particular link circuit, the operator reanswers or releases that link circuit, respectively.

Since the link circuits of the system described in the above-identified application are held operated for the duration of the calls between the calling and called lines associated with the channels seized by the link circuits, it is, of course, necessary to provide a large number of said link circuits. Further, each link circuit necessarily comprises a large amount of equipment because of the requirement that each link circuit must be able to detect and relay to the operator position recall and release supervisory information.

Accordingly, it is the general object of this invention to provide a new and improved electronic switching telephone system.

It is a more particular object of this invention to provide a new and improved electronic switching telephone system of the type in which certain calls incoming to an office are routed to an operator position in that office for answering and further extension and which system comprises a minimum of equipment.

In accordance with the present invention, the operator link circuits common to a plurality of operator positions are held operated only until the call on each link circuit has been further extended and a single recall link circuit is provided in the system for the purpose of scanning the transmission highway network channels for recall signals. The number of link circuits provided is greatly reduced over the number provided in the system disclosed in the above-identified application since each link circuit is freed for use on another call as soon as a call thereon has been answered. The link circuits are assigned for use in turn by an incoming distributor and are then enabled one at a time by an outgoing distributor provided in the system for seizure by or connection to any one of the operator positions in the same sequence in which calls are completed thereto. A particular feature of the present invention is that a single answer key for all of the link circuits is provided at each operator position. The operation of the answer key at any one of the positions serves to seize the link circuit enabled for seizure and thereby connect that link circuit to the answering operator position. The answering of any one of the link circuits controls the outgoing distributor to enable the next succeeding link circuit for seizure by any one of the operator positions.

As previously mentioned, the channels of the transmission network are scanned for voice frequency recall signals and when a recall signal is detected on a channel, the recall link circuit is controlled to seize that channel. The recall link circuit is immediately enabled for seizure and is given answering priority over a link circuit enabled for seizure. That is, the operation of the answer key at any position when the recall link circuit is enabled for seizure results in the seizure of the recall link circuit regardless of whether or not one of the link circuits is enabled for seizure at that time.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise twenty-one figures on twenty-one sheets.

Fig. 1 shows the trunking diagram of a telephone system in which the invention may be embodied.

Figs. 2, 3, 4, and 5, when arranged in numerical order from left to right, show a long distance switching center in block diagram form.

Fig. 6 shows circuit details of hybrid circuits for connecting operator link circuits and a recall link circuit to a transmission highway network.

Figs. 7, 8, 9, and 10, when arranged in numerical order from left to right, show circuit details of an operator link circuit.

Figs. 11 and 12, when arranged with Fig. 12 to the right of Fig. 11, show circuit details of an operator recall link circuit.

Fig. 13 shows circuit details of a link coupling circuit.

Fig. 14 shows circuit details of a recall link coupling circuit.

Figs. 15 and 16, when arranged with Fig. 16 to the right of Fig. 15, show circuit details of an operator position circuit.

Fig. 17 shows circuit details of an incoming distributor.

Fig. 18 shows circuit details of an outgoing distributor.

Figs. 19 and 20, when arranged with Fig. 20 to the right of Fig. 19, show circuit details of a recall scan control circuit.

Fig. 21 is a pulse chart of control pulses used in the disclosed system.

Figure 1:
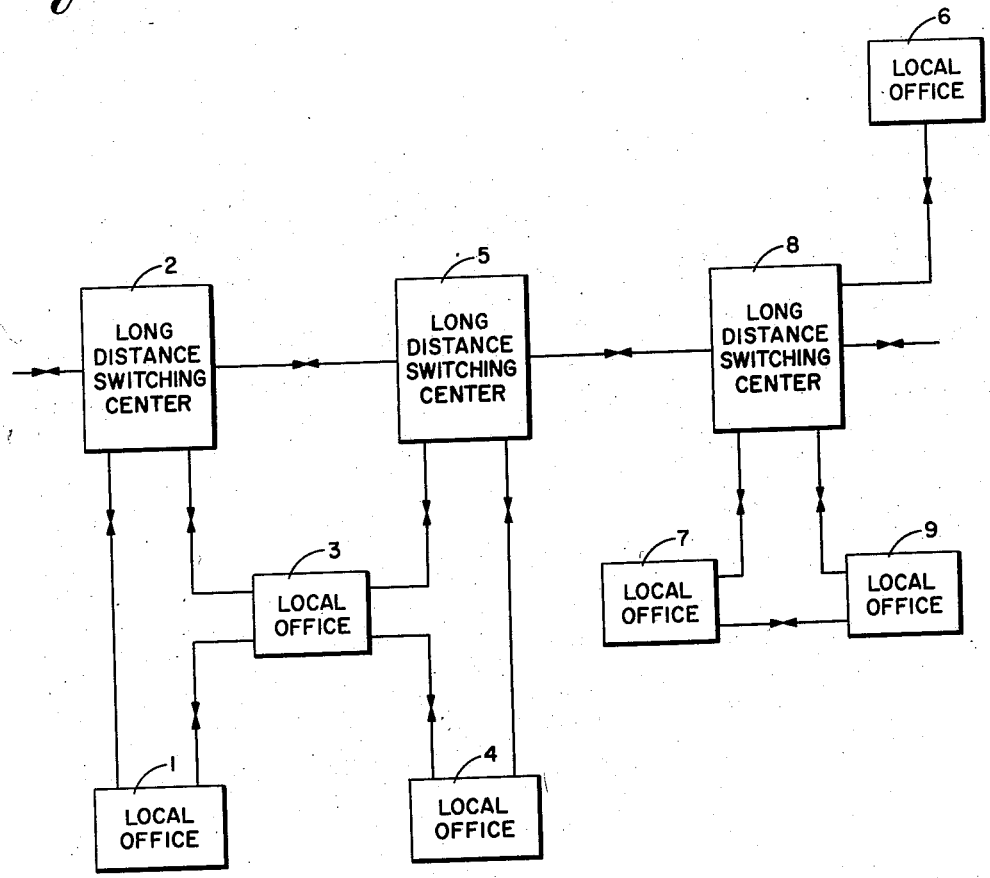

The overall operation of the system in which the invention has been illustrated can best be understood by reference to Figures 2, 3, 4, and 5 in conjunction with reference to the trunking diagram shown in Fig. 1. The invention has been illustrated as being embodied in a system developed for the military, but the principles taught by the invention can be practiced in commercial type telephone systems.

Figure 2:
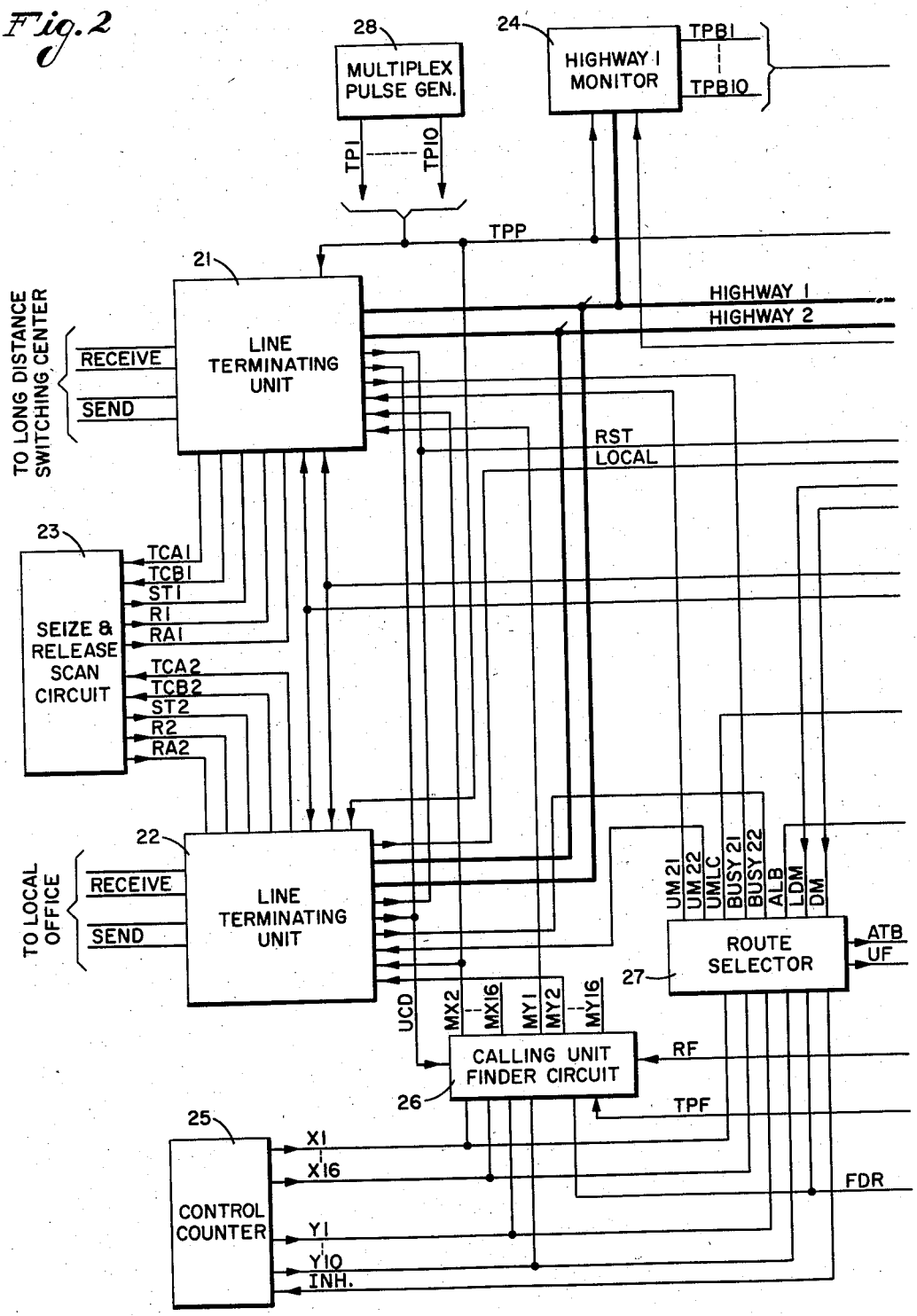
Figure 3:
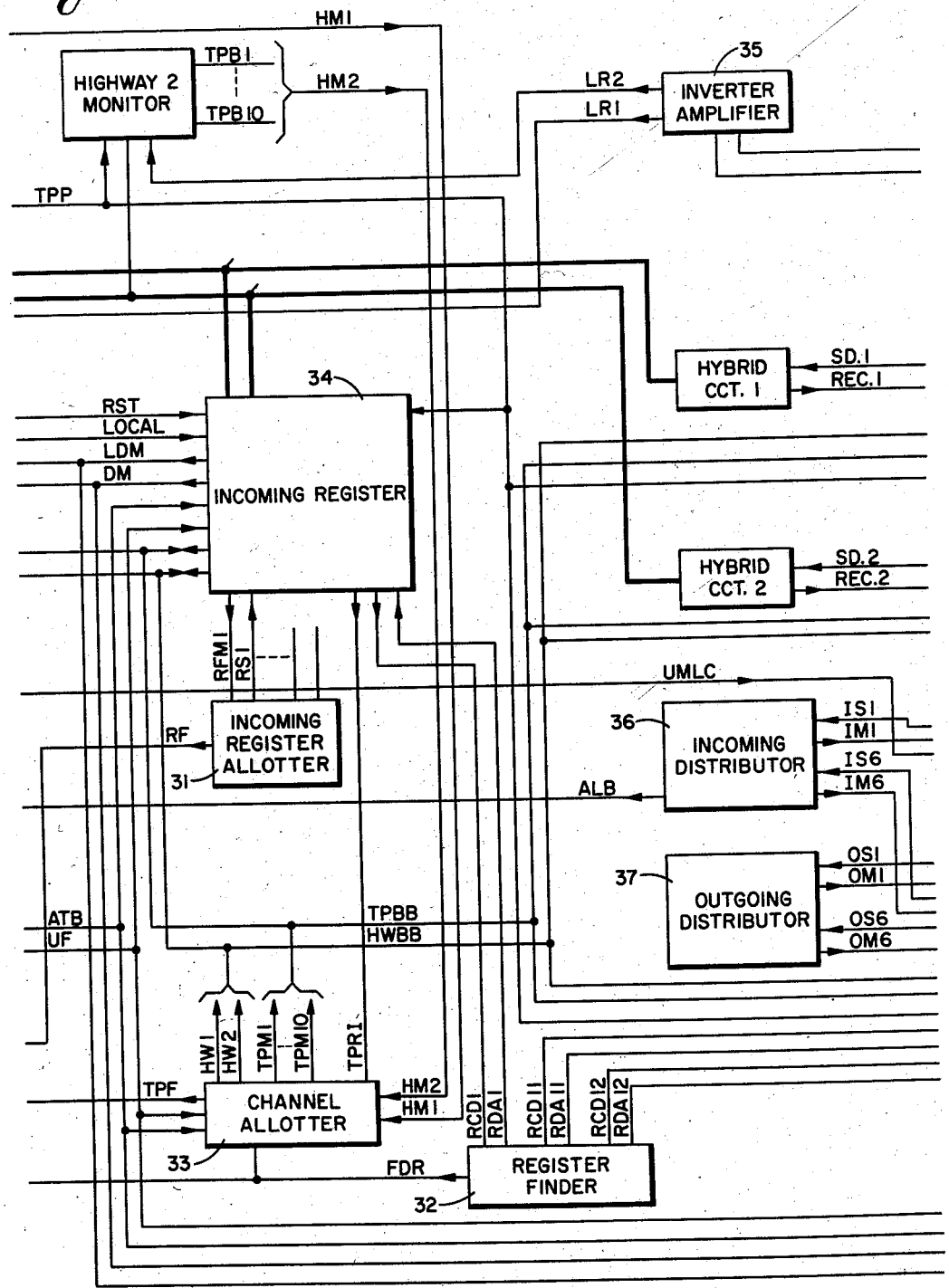

As shown in Fig. 1, calls between subscribers in different local offices may be routed through one or more long distance switching centers. For example, a call from a subscriber in local office 1 to a subscriber in local office 9 is routed through long distance switching centers 2, 5, and 8. The call is initiated by the transmission of a voice frequency seize signal over a trunk line interconnecting office 1 and long distance switching center 2, which trunk line is four-wire and may be either physical wire or a radio link. In long distance switching center 2, the line terminating unit terminating that trunk line is marked as a unit terminating a trunk line from a local office. For example, unit 22 in Fig. 2 is identified as a local unit by the inclusion of conductor local, which extends between unit 22 and incoming register 34. In response to the seizure of unit 22 and the subsequent marking of conductor local, incoming register 34 automatically controls route selector 27 to seize the one of the operator link circuits, such as link circuit 1 of Fig. 4, assigned for use by incoming distributor 36 in that long distance switching center. When link circuit 1 is enabled for connection to an operator position under control of outgoing distributor 37 and the operator at one of the operator positions operates the answer key at that position, link circuit 1 is connected to that position through a link 1 coupling circuit. For example, if operator position 1 answers the call under consideration, link circuit 1 is connected to operator position 1 through the position 1 link 1 coupling circuit. In accordance with instructions received over the connection from the originating subscriber at local office 1, the operator at position 1 then keys the routing digits required to reach local office 9 on the key set associated with register sender 1. The keyed number comprises routing digits corresponding to long distance switching centers 5 and 8, an arbitrary digit, which may be the digit "1," identifying local, and a digit corresponding to local office 9. The common equipment in long distance switching center 2 then functions to seize an idle terminating unit, such as unit 21 in Fig. 2, which terminates a trunk line extending to long distance switching center 5, and a seize signal is transmitted over that trunk line to seize the unit terminating that trunk line in long distance switching center 5. In long distance switching center 5, an incoming register, such as incoming register 34 of Fig. 3, then controls the common equipment, in accordance with the digit received from the key sender register in office 2, to select an idle terminating unit which terminates a trunk line extending between long distance switching centers 5 and 8. The operation in long distance switching center 8 is identical to that just described in long distance switching center 5 with the exception that the arbitrary digit "1" followed by the digit corresponding to local office 9 control the incoming register 34 in that office to control the selection of an idle terminating unit extending to local office 9 in the groups of local terminating units. In the illustrated system, the operator in office 2 then passes the number of the desired called station to the answering attendant in local office 9. Thus, it can be seen that the extension of a call is controlled from the answering operator position at the first long distance switching center encountered, the intermediate switching centers are each controlled by a single digit to select an idle trunk line to the next long distance switching center, and the terminating long distance switching center is controlled by two digits to select the desired local office.

Figures 2, 3, 4, and 5, which show in block diagram form the equipment located at any one of the long distance switching centers, will now be described in more detail. Although just two line terminating units, namely, units 21 and 22, have been shown, it is to be understood that there is supplied a group of line terminating units 21 for each long distance switching center accessible to the illustrated long distance switching center, and a group of line terminating units 22 for each local office accessible to the illustrated long distance switching center. For example, long distance switching center 5 comprises a group of line terminating units, such as unit 21, which terminate trunk lines or radio links between long distance switching centers 2 and 5 and a group of line terminating units, such as unit 21, which terminate trunk lines or radio links between long distance switching centers 8 and 5. Long distance switching center 5 also comprises a group of line terminating units, such as unit 22, which terminate trunk lines or radio links between local office 3 and long distance switching center 5 and a group of line terminating units, such as unit 22, which terminate trunk lines or radio links between local office 4 and long distance switching center 5. Similarly, only one incoming register, namely, incoming register 34, has been shown but it is to be understood that the number of incoming registers actually employed will be determined by the existing traffic conditions.

Figure 4:
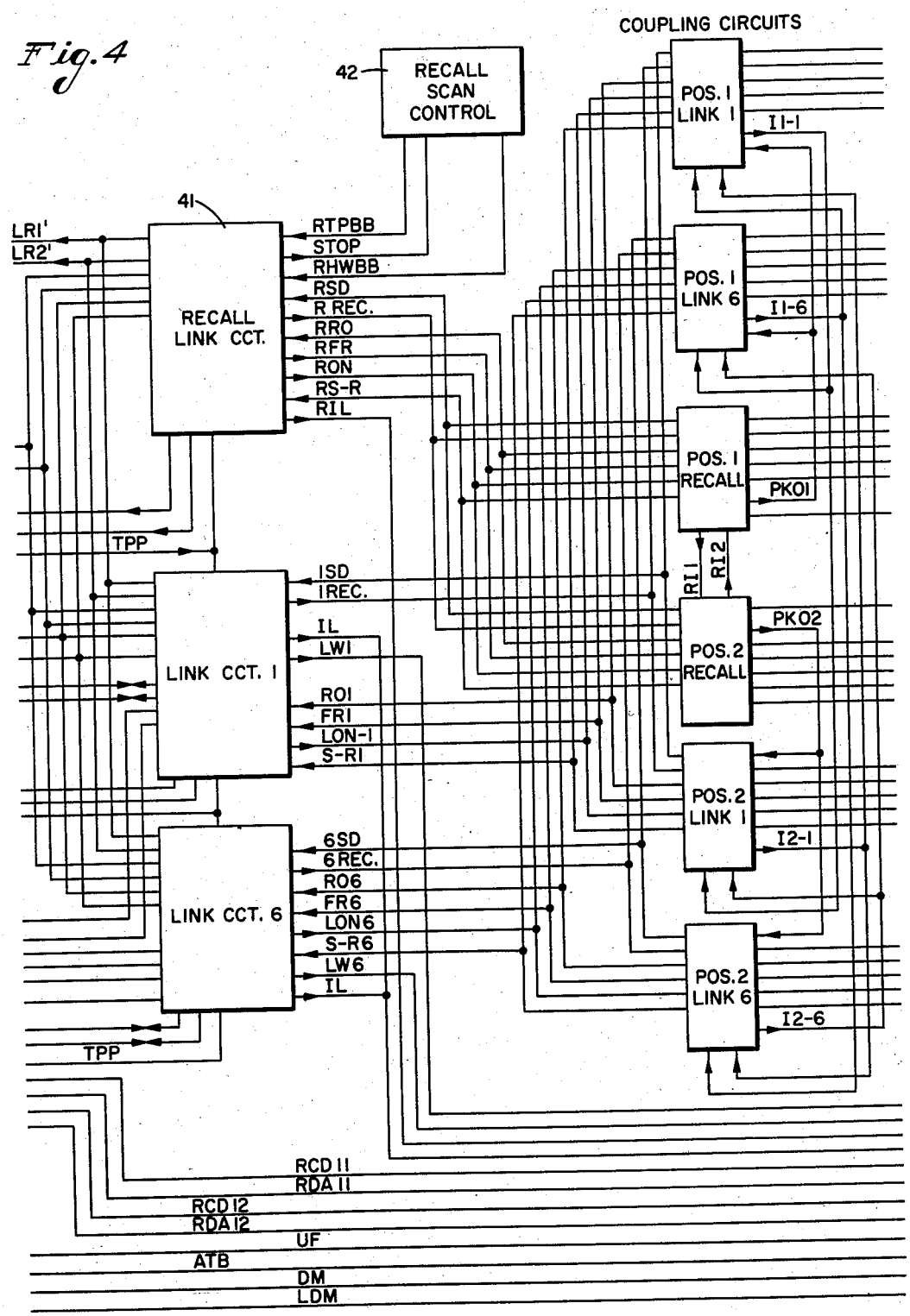
Figure 5:
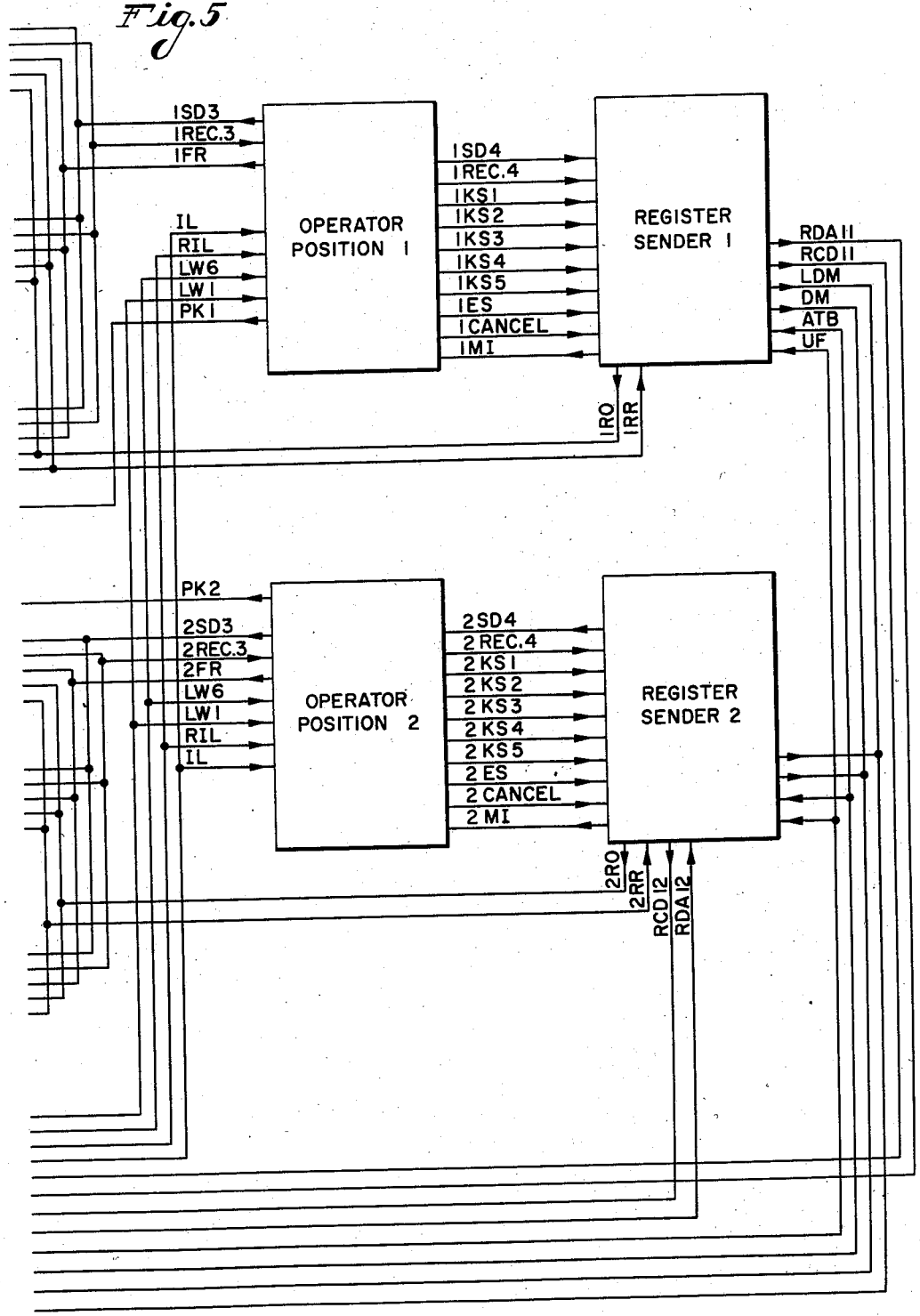

The line terminating units, such as 21 and 22, the incoming registers, such as 34, the operator link circuits, such as link circuit 1 and link circuit 6 of Fig. 4, and the recall link circuit 41 are all interconnected by one or more transmission highway networks. Two transmission highway networks are shown and are labeled highway 1 and highway 2. Each of the transmission highway networks comprises four wires carrying ten time division multiplex channels. Multiplex pulse generator 28, of Fig. 2, is provided in the system for the purpose of continuously providing recurring pulses on conductors TP1-TP10, which pulses individually identify the ten channels in each highway network. The pulses applied to conductors TP1-TP10 by multiplex pulse generator 28 may have a recurrence frequency of 12 kc. Preferably, each pulse persists for approximately four microseconds and a guard time of approximately four microseconds is provided between pulses. The pulses applied to conductors TP1-TP10, and which are graphically illustrated in Fig. 21 of the drawings, are routed over cable TPP to all of the line terminating units, to each of the highway monitor circuits, to each of the operator link circuits, to the recall link circuit, and to each of the incoming registers. As will be more fully described hereinafter, the above-described pulses are used in each of these circuits to periodically activate switches within each of the circuits for the purpose of connecting that circuit to a selected one of the highway networks in a selected time division channel.

The line terminating units, the incoming registers, the operator link circuits, and the recall link circuit are also interconnected by a control network comprising bus bars HWBB and TPBB. Since the illustrated system includes two highway networks, the highway marking bus bar HWBB comprises the two conductors HW1 and HW2. The time position marking bus bar comprises ten conductors TPM1–TPM10, inclusive. Channel allotter 33 is controlled to apply a D.-C. potential to one of the highway marking conductors and to one of the channel marking conductors at any given time for the purpose of individually assigning an idle channel to each calling line.

To illustrate the operation of the system, assume that channel allotter 33 is applying a D.-C. potential to conductors HW1 and TPM1 to thus identify channel 1 on transmission highway network 1 as the next idle channel to be assigned for use. Also assume that incoming register 34 has been assigned for use by incoming register allotter 31. An idle register is identified by the presence of potential on an individual register free marking conductor, such as RFM1, and is seized by the allotter by the application of a potential to an individual register seize conductor, such as RS1. Next assume that a voice frequency seize signal appears on the receive conductors of the trunk line terminated by line terminating unit 21. The trunk line receive conductors are coupled within unit 21 to conductors TCA1 and TCB1, which extend to seize and release scan circuit 23. Circuit 23 is associated with ten or more terminating units and is controlled to continuously scan the TC conductors from each of its associated terminating units for seize, release, and release acknowledge signals. By using a common circuit, such as 23, a single multi-frequency receiver is shared by ten or more units instead of having an individual receiver provided for each terminating unit. When the multi-frequency receiver in circuit 23 is connected to conductors TCA1 and TCB1, the voice frequency seize signal appearing on those conductors is detected by circuit 23 and a potential is applied to start conductor ST1 to seize line terminating unit 21. Unit 21 is responsive to the receipt of a start potential on conductor ST1 to apply potential to unit connect demand conductor UCD, which is common to all of the units and which extends to calling unit finder circuit 26. Unit 21 also functions at this time to apply potential to busy conductor unit 21 for the purpose of marking unit 21 busy to route selector 27.

Control counter 25, which comprises a sixteen stage ring counter driven from the output of a ten stage ring counter, is controlled to supply X and Y marking signals, which, in pairs, correspond to individual ones of the terminating units, to calling unit finder circuit 26 and to route selector 27. The tens stage ring in control counter 25 is driven by 20 kc. clock pulses, of the type graphically illustrated in Fig. 21, and the sixteen stage ring is driven by the tenth stage of the ten stage ring. An output signal is taken from each stage of each ring and applied to an individual conductor. Thus, while a signal is appearing on conductor X1, ten successive pulses appear on conductors Y1–Y10, inclusive. The sixteen stage ring is then advanced to mark conductor X2 and conductors Y1–Y10 are again marked in turn. Calling unit finder circuit 26 functions to repeat the marking signals received over conductors X1–X16, inclusive, and Y1–Y10, inclusive, to marking conductors MX1–MX16, inclusive, and MY1–MY10, inclusive, respectively, only when potential is applied to the unit connect demand conductor UCD by one or more calling units, when a register has been assigned for use as denoted by the application of potential to register found conductor RF by the incoming register alloter 31, and when an idle channel is being marked on the control network as denoted by the application of potential to the time position found conductor TPF by channel allotter 33.

Since it was assumed that channel allotter 33 is applying marking signals corresponding to channel 1 on highway network 1 to the control network, that incoming register 34 is assigned for use, and that terminating unit 21 is applying potential to conductor UCD, the calling unit finder circuit 26 now functions to repeat the marking signals received over conductors X1–X16, inclusive, and Y1–Y10, inclusive, to conductors MX1–MX16, inclusive, and MY1–MY10, inclusive. When potential is applied simultaneously to conductors MX2 and MY1, the storage circuit in calling line terminating unit 21 is controlled to read in the highway and channel marking signals applied by channel allotter 33 to the highway and time position marking bus bars HWBB and TPBB, respectively. Also responsive to the receipt of potential on conductors MX2 and MY1, unit 21 functions to discontinue the application of potential to conductor UCD and functions to apply potential to common register start conductor RST. Conductor RST is gated with the individual register seize conductor, such as RS1 in register 34, in each of the incoming registers so that only the storage circuit in the assigned register is controlled to read in the highway and channel marking signals appearing on the control network when a potential is applied to conductor RST by one of the units.

When the storage circuit in register 34 has read in the highway and time position information, a signal is applied highway and time position read in conductor TPRI, which extends to time position read in conductor TPRI, which extends from the incoming registers to channel allotter 33. The signal applied to conductor TPRI is effective in channel allotter 33 to mark channel 1 on highway 1 busy within the allotter so that that time position cannot be assigned to another call and the allotter 33 is further controlled to apply marking signals corresponding to the next idle channel to bus bars HWBB and TPBB.

The line terminating units, the incoming registers, the operator link circuits, and the recall link circuit each comprises a group of switches for connecting that unit, register, or link circuit to each of the transmission highway networks. In accordance with the channel and highway identifying information read into the storage circuit in any unit or register, the particular pulse on the one of the conductors TP1–TP10 corresponding to the assigned channel is gated to the group of switches corresponding to the assigned highway network and is there utilized to activate the switches. Thus in the assumed call, the switches associated with highway 1 in both line terminating unit 21 and in incoming register 34 are turned on by time position 1 pulse TP1 in each frame of the recurring time position pulses and unit 21 and register 34 are thereby connected to highway 1 during time position 1. The seize signal appearing on the receive conductors of the trunk line terminated by unit 21 is now detected by a multifrequency receiver in register 34 and, responsive thereto, incoming register 34 serves to transmit a seize acknowledge signal to highway 1 and thus to unit 21 and the send conductors of the trunk line terminated by unit 21. Since unit 21 terminates a trunk line from another long distance switching center, the call being described is set up under control of a key sender register in a preceding long distance switching center. The key sender in the originating long distance switching center is controlled by the received seize acknowledge signal to discontinue the transmission of a seize signal and to then transmit compounded voice frequency signals corresponding to the digit designation of the next long distance switching center to be utilized in establishing the connection. The multifrequency receiver in register 34 detects the transmitted voice frequency signals corresponding to a particular digit and a digit register in register 34 is set in accordance therewith. The incoming register 34 then transmits a digit acknowledge signal back over the trunk line to the originating office. The digit acknowledge signal also comprises compounded voice frequency signals which correspond to the particular setting of the digit register in incoming register 34, but at least one of the signals in the digit acknowledge signal is of a different frequency than the frequency used to set the digit register. The digit acknowledge signal enables the originating key sender register to compare the setting of the digit register in incoming register 34 with the digital information transmitted by the key sender. If the setting of the digit register in incoming register 34 is correct, the originating key sender transmits a second seize signal over the trunk line to incoming register 34.

The second seize signal received by incoming register 34 controls register 34 to apply potential to register connect demand conductor RCD1, which extends to register finder 32. When register finder 32 finds register 34, as denoted by the application of potential to register demand answer conductor RDA1, register 34 is controlled to read out the channel identification information stored in its storage circuit to the highway and time position marking bus bars HWBB and TPBB, respectively. Simultaneously therewith, register 34 serves to apply potential to one of the digit marking conductors, identified as DM, in accordance with the designation of the called unit registered in the digit register of register 34. Also simultaneously therewith, register finder 32 applies potential to found register conductor FDR, which extends to channel allotter 33, to route selector 27, and to calling unit finder circuit 26. The potential applied to conductor FDR controls channel allotter 33 to terminate the application of marking potentials to the highway and time position bus bars HWBB and TPBB. The potential applied to conductor FDR also controls the calling unit finder circuit 26 to terminate the application of marking potentials to the MX1–MX16 and MY1–MY10 conductors if circuit 26 is in the process of finding a calling unit. Thus when a register is reading out channel identifying information to the bus bars, the channel allotter is disconnected from said bus bars and the calling unit finder is disabled so that the time position marked by the register cannot be seized by a calling unit.

Route selector 27 is controlled by the marking applied to one of the conductors DM by the incoming register to select the desired called group of units and is further controlled by the signals successively applied to conductors X1–X16 and Y1–Y10 by control counter 25 and by busy marking signals applied to the busy conductors, such as busy 21 and busy 22, to select an idle unit in the selected group of units. If, as was assumed, the call is to be routed to another long distance switching center, a line terminating unit identical to unit 21 is seized by the route selector by the application of potential to the unit marking conductor, such as UM21, corresponding to that unit. If there is no idle unit available, route selector 27 applies a potential to all trunks busy conductor ATB which controls the incoming register 34 to return a busy signal to the originating office and also controls channel allotter 33 to resume its operation. When an idle unit in the called group is seized, route selector 27 functions to apply potential to the unit found conductor UF, which extends to the channel allotter, the incoming registers, and to the register senders of Fig. 5. Simultaneously therewith, route selector 27 applies potential to inhibitor conductor INH, which extends to the control counter 25 for the purpose of momentarily halting the stepping of the ring circuits in that circuit so that the X and Y conductors corresponding to the seized unit remain marked for a short period of time. When the seized unit applies ground to its individual busy conductor, such as busy 21, the route selector removes potential from conductors UF and INH. Incoming register 34 is controlled by the potential applied to conductor UF and by the next occurring 20 kc. clock pulse, of the type shown in Fig. 21, to restore to its normal unoperated condition. Channel allotter 33 is controlled by the potential applied to conductor UF and by the next occurring clock pulse to re-apply the marking potentials corresponding to the next idle channel to bus bars HWBB and TPBB.

The storage circuits in the calling and called units now control the connection of their respective units to highway 1 during time position 1 for the transmittal of speech and supervisory signals between the units for the duration of the call.

At the termination of the call, a voice frequency release signal is transmitted over either the calling trunk line or the called trunk line and is detected by the seize and release scan circuit associated with either the calling unit or called unit, respectively. If it be assumed that a release signal appears on the receive conductors of the trunk line associated with line terminating unit 21, the receive signal is detected on conductors TCA1 and TCB1 by seize and release scan circuit 23, and circuit 23 functions to apply potential to conductor R1 which extends to unit 21. When potential is applied to conductor R1, unit 21 functions to apply a voice frequency release acknowledge signal to the send conductors of its associated trunk line for a purpose which will become apparent as the description proceeds.

The release signal received over the trunk line also appears in time position 1 on highway 1 and is detected by a multi-frequency receiver in highway 1 monitor circuit 24, which circuit is controlled to continuously scan the ten time position channels on highway 1 for release and release acknowledge signals. Unit 21 is released and its storage circuit returned to its normally unoperated condition responsive to the receipt of potential on conductor R1 but only after a time delay of sufficient duration to allow the release signal to be detected by highway 1 monitor circuit 24. The received release signal is regenerated in highway 1 monitor circuit 24 and applied in time position 1 to highway 1. The regenerated release signal is demodulated in the called line terminating unit and applied to the send conductors of the trunk line associated with the called unit. The regenerated release signal transmitted over the called trunk line serves to release the incoming line terminating unit in the succeeding long distance switching center after that unit has functioned to return a release acknowledge signal over the called trunk line to the illustrated long distance switching center.

The release acknowledge signal returned over the called trunk line is detected by the seize and release scan circuit associated with the called unit and potential is applied to the release acknowledge conductor, such as RA1, which extends to the called unit. The release acknowledge signal received over the called trunk line also appears in time position 1 on highway 1 and is detected in highway 1 monitor circuit 24. Highway 1 monitor circuit 24 is controlled by the received release acknowledge signal to terminate the regeneration of the release signal and to apply a potential to time position busy 1 conductor TPB1, which extends in highway monitor 1 cable HM1 to channel allotter 33. In channel allotter 33, time position 1 on highway 1 is marked as idle responsive to the receipt of a potential on conductor TPP1 in cable HM1. The called line terminating unit is released and its storage circuit returned to its normally unoperated condition responsive to the receipt of potential on conductor RA1 but only after a delay of sufficient duration to allow the release acknowledge signal to be detected by highway 1 monitor circuit 24. Thus, it can be seen that the release signal is regenerated in each succeeding long distance switching center and that the regenerated release signal is transmitted until a release acknowledge signal is received from the next succeeding office. This feature is incorporated in the illustrated system for the purpose of offsetting the effects of fading when radio links are used in the system.

The operation of the long distance switching center, shown in Figs. 2, 3, 4, and 5, is somewhat different from the above when a call is originated at a local office having access to the illustrated long distance switching center. As previously explained, the line terminating units which terminate trunk lines from local offices are characterized as such by a local conductor which extends between those units and the incoming registers. When a local office terminating unit, such as unit 22, is seized on a call from a local office to the illustrated long distance switching center, a potential is applied in that unit to conductor local simultaneously with the application of potential to the register start conductor RST. Under these conditions, the assigned incoming register is controlled to automatically store the digit corresponding to the operator link circuits, which digit may be the digit "0," in its digit register. The incoming register immediately calls for the register finder and the route selector is controlled to apply a start potential to units marking conductor UMLC which is common to all of the link circuits. The link circuits are assigned for use in turn by incoming distributor 36. An idle link circuit is identified by the presence of potential on an individual seize conductor, such as IS1 for link circuit 1, and is assigned for use by the incoming distributor by the application of potential to an individual mark conductor, such as IM1 for link circuit 1. If it is assumed that link circuit 1 is assigned for use at this time, that link circuit is seized when potential is applied to conductor UMLC and the storage circuit therein is controlled to read in the time position and highway information applied to bus bars HWBB and TPBB by incoming register 34 in the exact same manner as previously described. Thus responsive to seizure, the calling line terminating unit and an idle one of the link circuits are connected to an idle channel on one of the highway networks.

When the time position and highway information has been read into the storage circuit of link circuit 1 and incoming register 34 is no longer applying marking potentials to bus bars HWBB and TPBB, potential is removed from conductor IS1 and the incoming distributor 36 is thereby controlled to assign link circuit 2 for use on the next call to the operator positions. If all of the link circuits are storing unanswered calls, incoming distributor 36 applies potential to all link circuits busy conductor ALB for the purpose of controlling route selector 27 to apply potential to conductor ATB whenever an incoming register demands connection to an operator link circuit while all of said link circuits are busy.

It can be seen that the link circuits 1–6, inclusive, and the recall link circuit 41 are connected to highway 1 by send and receive conductors SD1 and REC.1, respectively, through hybrid circuit 1. Similarly, link circuits 1–6, inclusive, and recall link circuit 41 are connected to highway 2 by send and receive conductors SD2 and REC.2, respectively, through hybrid circuit 2.

When link circuit 1 is seized by the route selector and the highway and time division channel information is read into its storage circuit, potential is applied to seize conductor OS1 to thereby signal the outgoing distributor 37 that link circuit 1 is demanding answering attention. Outgoing distributor 37 serves to enable the link circuits one at a time for seizure by or connection to any one of the operator positions. Since incoming distributor 36 assigns the link circuits for use in turn in numerical order and outgoing distributor 37 enables the link circuits for connection to an operator position in the same numerical order, the link circuits are enabled for connection to an operator position in the same sequence that connections from calling lines are completed to said link circuits.

Each operator position comprises a single answer key, a link waiting lamp for each link circuit, and a single incoming call lamp. As each link circuit is seized by the route selector, that link circuit serves to apply potential to an individual link waiting conductor, such as LW1 for link circuit 1, to thereby illuminate the link waiting lamp corresponding to link circuit 1 at operator positions 1 and 2. Potential is applied to the incoming lamp common conductor IL to illuminate the incoming lamp at each operator position by each link circuit in turn when enabled for connection to an operator position. Each of the link circuits is coupled to both of the operator positions through coupling circuits so that a call can be answered at either position. For example, link circuit 1 is coupled to operator position 1 by coupling circuit position 1 link 1 and to operator position 2 by coupling circuit position 2 link 1.

If it is assumed that the call under consideration is answered at operator position 1, the answer key at operator position 1 is operated and potential is applied to conductor PK1, which extends to the coupling circuit position 1 recall. If there are no previously completed connections demanding recall connection at this time, the potential applied to conductor PK1 is coupled to conductor PKO1 in the position 1 recall coupling circuit and routed to the link coupling circuits associated with operator position 1. Coupling circuit position 1 link 1 is responsive to the simultaneous receipt of potential on conductor PKO1 and potential on link-on conductor LON1 from link circuit 1 to cut through the send and receive conductors 1SD and 1REC from link circuit 1 to the send and receive conductors 1SD3 and 1REC.3, which extend to operator position 1. Simultaneously therewith, coupling circuit position 1 link 1 applies potential to inhibit conductor I1–1 to prevent any other coupling circuit associated with operator position 1 from cutting through while the call on link circuit 1 is being answered by that position and to prevent coupling circuit position 2 link 1 from cutting link circuit 1 through to operator position 2 when a call is answered at that operator position while the call on link circuit 1 is being answered by operator position 1. When the call on link circuit 1 is answered, link circuit 1 removes potential from conductor OS1 and outgoing distributor 37 is thereby controlled to enable link circuit 2 for connection to one of the operator positions.

In accordance with oral instructions received over the trunk line and transmitted in the assigned time position on the assigned highway network to the link circuit, and coupled over conductors 1REC and 1REC.3, the operator at the answering position 1 keys the digits corresponding to the route required to reach the desired called party. The operation of any particular key results in the application of a D.-C. potential to a unique combination of two of the five conductors KS1–KS5, inclusive. The digit information received over conductors KS1–KS5 is stored in register sender 1 and at the end of the keying operation, which is indicated by the application of potential to end of selection conductor ES, register sender 1 applies potential to register connect demand conductor RCD11. When register sender 1 is found by register finder 32, as denoted by the application of potential to register demand answer conductor RDA11, register sender 1 applies potential to read out conductor 1RO, which extends to the call coupling circuits associated with operator position 1. Link circuit 1 is controlled by the potential applied to conductor 1RO, and coupled through coupling circuit position 1 link 1 to conductor RO1, to control its storage circuit to read out the stored highway and channel marking information to bus bars HWBB and TPBB. Digit marking information corresponding to the first digit stored in the digit register in the register sender 1 is simultaneously applied by the register sender 1 to one of the digit marking conductors DM for the purpose of controlling route selector 27 to seize an idle unit in the group of line terminating units corresponding to said digit marking. Register sender 1 then functions to apply a voice frequency seize signal to send conductors 1SD4 and thus over send conductors 1SD3 and 1SD to link circuit 1. In link circuit 1, the seize signal is multiplexed onto the assigned highway in the assigned time position and thus routed to the line terminating unit corresponding to the called office and over the trunk line or radio link to the called office. As previously mentioned, register sender 1 continues to transmit a seize signal unit a seize acknowledge signal is received from the incoming register in the called office over conductors 1REC., 1REC.3, and 1REC.4. When a seize acknowledge signal is received, register sender 1 discontinues the transmission of a seize signal and then transmits a compound voice frequency signal corresponding to the next registered digit to send conductors 1SD4 and thus to the called office. The digit designation signal is transmitted until a digit acknowledge signal is received. As previously explained, if the digit acknowledgement signal is not correct for the digit designation signal transmitted, register sender 1 transmits a voice frequency cancel signal and then retransmits the canceled digit designation.

If the attendant should wish to reset the digit registers in register sender 1 before the end of selection key has been operated and thus before the sender has started to transmit, a cancel key is operated at operator position 1 and potential is applied to conductor 1 cancel for this purpose. If it is desired to cancel transmitted digits when the attendant realizes that a mistake in keying has been made or if an ATB condition is encountered and the attendant desires to reroute the call, a forward release key at operator position 1 is operated and potential is applied to link forward release conductor 1FR. The potential on conductor 1FR is routed through operated coupling circuit position 1 link 1 and applied to conductor FR1. In link circuit 1, the potential on conductor FR1 is converted to pulses in the assigned time position and the resulting pulses are applied to conductor LR1' (assuming that highway 1 is the assigned highway). The pulses on conductor LR1' are amplified and inverted by inverter amplifier 35 and routed over conductor LR1 to highway 1 monitor circuit 24 where they are effective to cause the release of all circuits in the forward direction only. That is, the called line terminating unit and the circuits in the distant offices are released but the assigned time position is not marked idle to the channel allotter so that the calling line terminating unit and link circuit 1 remain activated.

When register sender 1 is seized by the register finder 32 to initiate the transmission of digit information, a timing circuit is activated in register sender 1 to measure a ten second "no acknowledgment" period during which the call should be completed. During this period, potential is applied to microphone inhibit conductor 1MI for the purpose of cutting off the attendant's microphone so as to prevent interference with the voice frequency signaling.

When the call has been completed between the calling line and the desired called line, the operator at operator position 1 retires from the connection by restoring the answer key at operator position 1 to thereby remove potential from conductor PK1. When potential is removed from conductor PK1, coupling circuit position 1 link 1 and link circuit 1 are fully released and thus freed for use on another call.

Recall link circuit 41 and recall scan control circuit 42 are provided in the system for the purpose of scanning the time position channels on highways 1 and 2 for recall signals. Recall scan control circuit 42 comprises a ten position time position distributor and a two position highway distributor, which is driven by the last stage of the time position distributor. Circuit 42 serves to apply a D.-C. potential to one of the two conductors of the recall highway bus bars RHWBB while a D.-C. potential is applied to each of the ten conductors of the recall time position bus bars RTPBB, in turn. Thus, the ten time positions on highway 1 and then the ten time positions on highway 2 are marked over bus bars RHWBB and RTPBB in continuous sequence. The signals applied to the bus bars are gated with the time position pulses appearing in cable TPP in recall link circuit 41 to control the connection of a recall multifrequency receiver in recall link circuit 41 to each of the time positions on highways 1 and 2 in turn. If a compound voice frequency recall signal is detected on any one of the time position channels, recall link circuit 41 applies potential to conductor STOP to terminate the stepping operation of the distributors in recall scan control circuit 42 so that link circuit 41 remains connected to that time position channel. Also responsive to the detection of a recall signal on any one of the channels, recall link circuit 41 serves to apply potential to recall incoming lamp conductor RIL and to recall on conductor RON for the purpose of illuminating the incoming lamp at each operator position and for enabling position 1 recall and position 2 recall coupling circuits for operation, respectively. When potential is applied to conductor RIL, the incoming lamp is flashed regardless of whether or not one of the link circuits is enabled for seizure at that time.

If the recall is answered at operator position 1, potential is applied to conductor PK1, as previously described. Since position 1 recall coupling circuit is enabled for operation at this time by potential on conductor RON, that circuit serves to cut through the send and receive conductors RSD and RREC from the recall link circuit 41 to the send and receive conductors 1SD3 and 1REC.3 to operator position 1. It is to be noted that the potential on conductor PK1 is not coupled to conductor PKO1 under these conditions so that recall link circuit 41 is given answering priority over any link circuit enabled for connection to an operator position. However, if a call on one of the link circuits is answered before a recall signal is detected and potential is already being applied to conductor PK1 at the time that recall link circuit 41 applies potential to conductor RON, coupling circuit position 1 recall continues to couple the potential on conductor PK1 to conductor PKO1 so that the previously answered call is not released. When position 1 recall coupling circuit cuts through, potential is applied to recall inhibit conductor RI1 to prevent coupling circuit position 2 recall from cutting through when the operator at operator position 2 next operates the answer key at that operator position.

The answering operator can perform any of the functions which can be performed on a regular link circuit on the recall link circuit. For example, if the recalling calling party wishes to be connected to another called party, the operator at position 1 operates the forward release key to apply potential to conductors 1FR and RFR to release the circuits in the forward direction in the exact same manner as previously described for link circuit 1. The operator then keys the number of the desired called party into register sender 1, register sender 1 calls for the register finder, and when potential is applied to conductor RDA11 by register finder 32, register sender 1 applies potential to conductor 1RO, the potential on conductor 1RO is coupled to conductor RRO in coupling circuit position 1 recall, and recall link circuit 41 is controlled to read out highway and time position information to bus bars HWBB and TPBB, respectively. When the recall is completed, the operator at operator position 1 restores the answer key at that position and recall link circuit 41 and coupling circuit position 1 recall are freed for use on another call. When recall link circuit 41 releases, potential is removed from conductor STOP and the recall scan control circuit 42 resumes its stepping operation so that the channels are again scanned in order for recall signals.

The operation of the illustrated long distance switching center is slightly different from the above when the desired called line is associated with a local office associated with the illustrated long distance switching center. As previously described, an arbitrary digit "1" is prefixed to the digit identifying the terminating local office so that the incoming register such as 34, is controlled to apply the digit marking corresponding to the designation of the desired local office to a set of local digit marking bus bars, identified as LDM. This feature is included in the illustrated system so that the long distance switching center can serve more than ten groups of local and long distance trunk lines.

Only the hybrid circuits, an operator link circuit, a recall link circuit, a link coupling circuit, a recall link coupling circuit, an operator position circuit, the incoming distributor, the outgoing distributor, and the recall scan control circuit are shown and described in detail in this application. The remaining circuits, shown in block diagram form in Figs. 2, 3, 4, and 5, are shown and described in complete detail in the above-identified copending application.

DETAILED DESCRIPTION

Hybrid circuits

Figure 6:
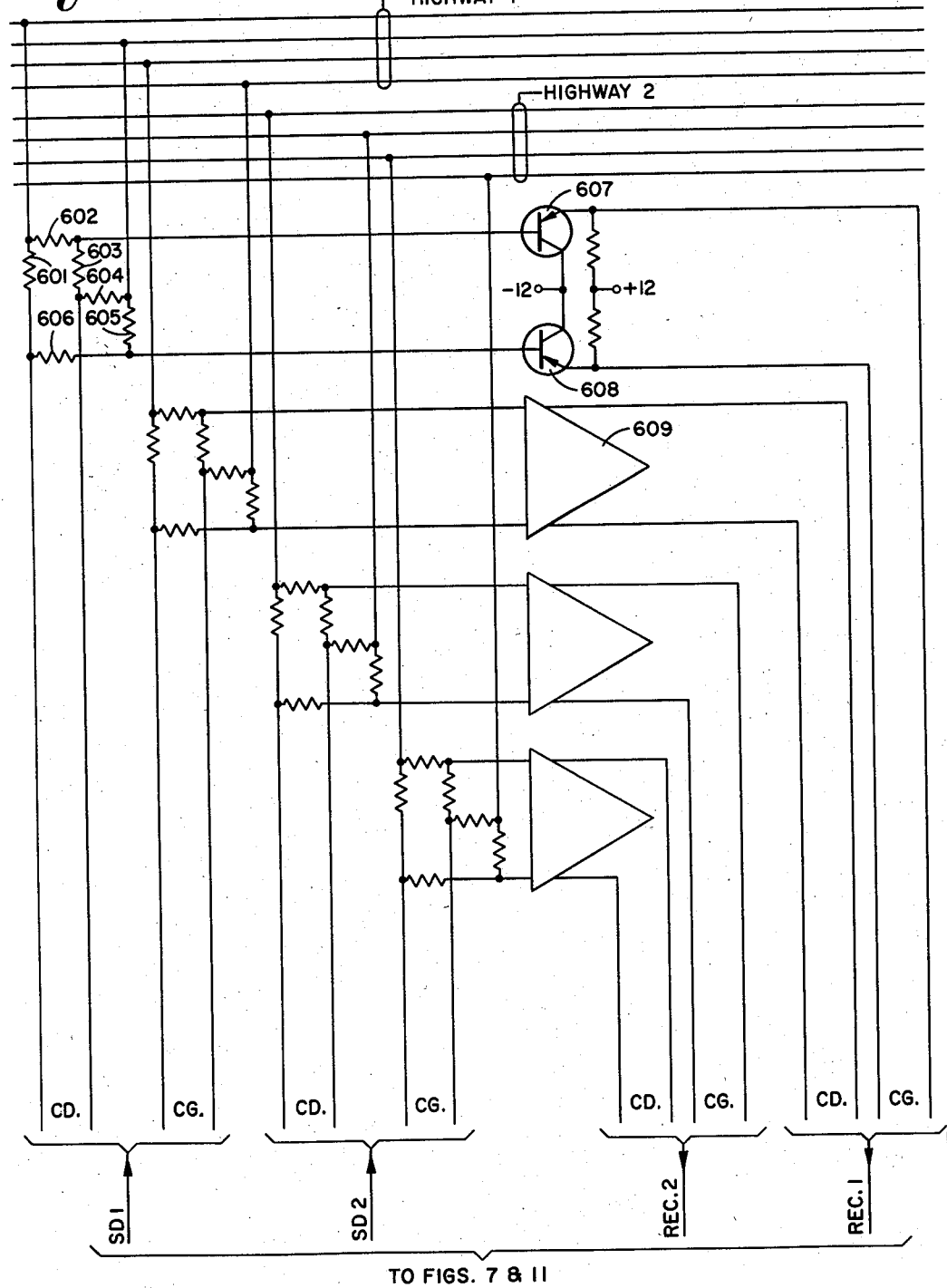

The hybrid circuits, which are shown in Fig. 6, are utilized to connect the operator position equipment to the transmission highway networks. As fully described in the above-identified copending application, calling line terminating units transmit signal samples to the upper pair of highway conductors and receive signal samples from the lower pair of highway conductors, while called line terminating units transmit signal samples to the lower pair of highway conductors and receive signal samples from the upper pair of highway conductors. Hybrid circuits are required to connect the operator positions to the highways since each operator position must send to and receive from both the calling and called line terminating units in the process of establishing a connection. For example, the answering operator must converse with the calling party to determine the desired route, supervisory and digit designation information must be transmitted to the called unit, acknowledgment information is received from the called unit, and recall signals may be received from the calling unit.

Each resistor hybrid network comprises four resistors, namely, resistors 601, 602, 604, and 605, of equal resistance values, and two resistors, namely, resistors 603 and 606, each having twice the resistance value of each of the aforementioned resistors. Thus, signal samples appearing on the upper pair of highway 1 conductors from a calling unit are coupled to and amplified by push-pull connected, emitter follower, amplifier transistors 607 and 608 and applied to the calling pair of receive conductors REC.1, signal samples appearing on the lower pair of highway 1 conductors from a called unit are coupled to and amplified by amplifier 609 and applied to the called pair of the receive conductors REC.1, signal samples appearing on the called pair of the sending conductors SD1 are coupled to the upper pair of highway 1 conductors for transmission to the called unit, and signal samples appearing on the calling pair of the send conductors SD1 are coupled to the lower pair of highway conductors for transmission to the calling unit. As illustrated, a duplicate set of equipment is, of course, provided for highway 2.

Link circuit 1

Figure 7:
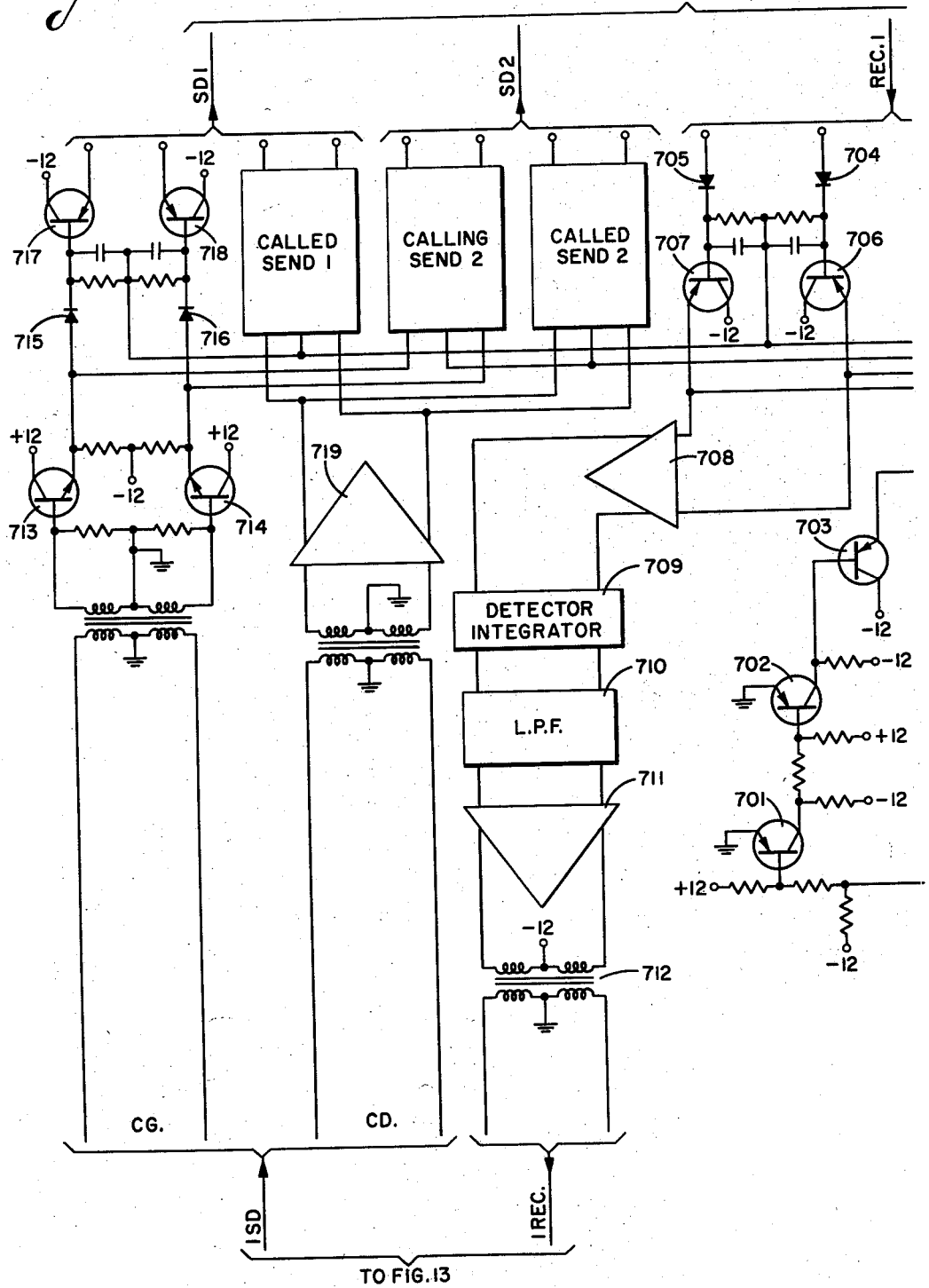

When link circuit 1, which is shown in detail in Figs. 7-10, inclusive, is in the idle or reset condition, the send gates of Fig. 7 and the receive gates of Figs. 7 and 8 are closed, each flip-flop circuit in which the emitter of one transistor is returned to reset conductor RS is in the condition wherein the other transistor in that flip-flop circuit is conductive, and the flip-flop circuit in each of the ten time position store circuits (Fig. 8) is in the condition in which both transistors comprising the flip-flop circuit are non-conductive. In the idle condition, the incoming distributor demand control flip-flop circuit comprising transistors 901 and 902 is in the condition in which transistor 902 is non-conductive and a negative potential is therefore applied to the base of transistor 903 to hold that transistor conductive. Ground potential appearing at the collector of conducting transistor 903 is coupled through diode 904 to the base of transistor 905 to hold that transistor non-conductive. Negative potential is therefore applied to conductor IS1 indicating to the incoming distributor that the illustrated link circuit is idle and is in readiness for use.

It will be recalled from the general description that when a call is initiated on a line terminating unit which terminates a trunk line or radio link from a local office, the incoming register automatically registers the digit "0" and then controls the route selector to apply potential to conductor UMLC, which is common to all of the operator link circuits. Simultaneously therewith, the incoming register is controlled to read out time position and highway information to the time position bus bars TPBB and to the highway bus bars HWBB, respectively, for the purpose of controlling the link circuit assigned by the incoming distributor to seize the time position channel seized by the calling line terminating unit.

The illustrated link circuit is seized by the route selector by the application of a positive-going potential to the units marking conductor UMLC only if the illustrated link circuit is assigned for use by the incoming distributor, as signified by the application of ground potential to conductor IM1, which is individual to the illustrated link circuit.

When link circuit 1 is assigned for use by incoming distributor 36, ground potential is applied to conductor IM1 and thus to the emitter electrodes of seize transistor 907 and read in reset transistor 908 to enable those transistors for operation. The positive-going potential swing on conductor IM1 is also coupled through capacitor 1001 and diode 1002 to trigger the outgoing distributor control flip-flop circuit to the condition in which transistor 1004 is conductive. When transistor 1003 becomes non-conductive, negative potential is applied to conductor OS1 and serves as a seize signal to the outgoing distributor 37. When the call on the last link circuit, link circuit 6 in the illustrated system, is answered, the outgoing distributor will automatically step to the position wherein ground potential is applied to conductor OM1 thereby signifying that the next call to be answered will be the call on link circuit 1. The application of ground potential to conductor OM1 and thus to the emitter of transistor 1005 is without effect at this time since a connection has not yet been completed between a calling line and the illustrated link circuit.

When ground potential is applied to conductor UMLC by the route selector, transistor 906 is rendered non-conductive and, assuming that the illustrated link circuit is assigned for use, seize transistor 907 is rendered conductive. The positive-going potential swing at the collector of transistor 907 is coupled through capacitor 909 and diode 910 to trigger the read in flip-flop circuit to the condition in which transistor 911 is conductive and transistor 912 is non-conductive. When transistor 912 becomes non-conductive, the negative-going potential swing at its collector is coupled through capacitor 913 and diode 914 to trigger the incoming distributor demand control flip-flop circuit to the condition in which transistor 902 is conductive and transistor 901 is non-conductive. When transistor 902 becomes conductive, transistor 903 is rendered non-conductive and the ground potential normally supplied through diode 904 to hold transistor 905 non-conductive is interrupted. Transistor 905 does not become conductive at this time, however, since transistor 915 was rendered non-conductive when seize transistor 907 first became conductive and transistor 916 is rendered conductive when transistor 902 becomes conductive to apply ground potential to the emitter of transistor 916. Ground potential appearing at the collector of conducting transistor 916 is coupled through diode 917 to maintain transistor 905 non-conductive. Transistors 915 and 916 are provided in the circuit for the purpose of preventing negative potential from being removed from conductor IS1 until conductor UMLC is no longer marked by the route selector and until the highway and channel marking potentials are no longer applied to bus bars HWBB and TPBB by the incoming register. In other words, the incoming distributor is prevented from advancing to assign the next idle link circuit for use until the illustrated link circuit has completed the reading in operation.

Also when transistor 902 of the incoming distributor demand control flip-flop circuit becomes conductive, normally conductive transistor 1006 is rendered non-conductive and transistor 1005 is thereby rendered conductive if the illustrated link circuit is assigned for answering at this time, as signified by ground potential on conductor OM1. When transistor 1005 becomes conductive, transistor 1007 is rendered non-conductive and negative potential is applied to incoming lamp conductor IL. Also when transistor 1005 becomes conductive, the resulting positive-going potential swing at its collector is coupled through capacitor 1008 and diode 1009 to trigger the link-on flip-flop circuit to the condition in which transistor 1010 is conductive and transistor 1011 is non-conductive. When transistor 1010 becomes conductive, ground potential is applied to the link-on conductor LON1 to enable the coupling circuits associated with the illustrated link circuit at the various operator positions for operation when the answer key at any one of the positions is operated, as described in the general description.

Returning to the consideration of the incoming distributor demand control flip-flop circuit, it can be seen that when transistor 902 becomes conductive, the positive-going potential swing at its collector is coupled through capacitor 1012 and diode 1013 to trigger the link waiting control flip-flop circuit to the condition in which transistor 1023 is non-conductive and transistor 1024 is conductive. Under these conditions, transistors 1016 and 1017 are rendered conductive and potential is applied to the link waiting conductor LW1 to illuminate the link waiting lamp corresponding to link circuit 1 at each of the operator positions. It is to be noted that the link waiting lamp is illuminated whether or not the illustrated link circuit has been enabled by the outgoing distributor for connection to an operator position whereas the incoming lamp is not illuminated until the link circuit has been enabled for connection.

It will be recalled that the read in flip-flop circuit was triggered to the condition in which transistor 911 is conductive and transistor 912 is non-conductive to initiate all of the just described operation when seize transistor 907 first became conductive. When transistor 912 first becomes non-conductive and negative potential is applied to read in conductor RI, the highway selector and time position store circuits are controlled to read in the highway and channel marking signals applied to bus bars HWBB and TPBB, respectively, by the assigned incoming register. The base of a transistor corresponding to transistor 801 in each highway selector and the base of a transistor corresponding to transistor 802 in each time position store circuit are returned to conductor RI, the emitter of each transistor corresponding to 801 is returned to an individual one of the highway marking bus bar conductors, and the emitter of each transistor corresponding to 802 is returned to an individual one of the time position marking bus bar conductors. If it is assumed that the incoming register is applying ground potential to highway conductor HW1 and to time position marking conductor TPM1, thus identifying channel 1 on highway 1, transistors 801 and 802 are rendered conductive. The transistors corresponding to 801 and 802 in the other highway selector and time position store circuits, respectively, are not rendered conductive since their emitter electrodes are returned to minus twelve volt potential appearing on their individually associated highway marking and time position marking conductors. The positive-going potential swing at the collector of conducting transistor 801 is utilized to trigger the flip-flop circuit comprising transistors 803 and 804 to the condition wherein transistor 803 is non-conductive and transistor 804 is conductive. Similarly, the positive-going potential swing at the collector of conducting transistor 802 is utilized to trigger the flip-flop circuit comprising transistors 805 and 806 to the condition wherein both transistors are conductive.

The next occurring positive-going clock pulse on conductor 20 kc. trigger, which pulses are graphically illustrated in Fig. 22, serves to render normally conductive transistor 918 non-conductive to thereby render read in reset transistor 908 conductive. The positive-going pulse appearing at the collector of transistor 908 is coupled through capacitor 919 and diode 920 to reset the read in flip-flop circuit so that transistor 912 is again conductive. When transistor 912 becomes conductive, conductor RI and the base electrodes of each transistor corresponding to 801 and each transistor corresponding to 802 rise to ground potential. Thus, the storage circuit in the illustrated link circuit is controlled to read in highway and channel marking signals appearing on the bus bars HWBB and TPBB and the read in circuits are then reset so that further signals appearing on those bus bars have no effect on the illustrated link circuit. The route selector and the incoming register are also controlled by the clock pulse to discontinue the application of marking potential to conductor UMLC and the bus bars, as fully described in the above-identified copending application. When the potential on conductor UMLC goes negative, transistor 906 again becomes conductive and seize transistor 907 becomes non-conductive. When transistor 907 becomes non-conductive, transistor 915 is rendered conductive and transistor 916 becomes non-conductive to discontinue the application of ground potential through diode 917 to the base of transistor 905. Since both transistors 903 and 916 are now non-conductive, the output of the "and" gate for negative signals comprising diodes 904 and 917 goes negative and transistor 905 becomes conductive to apply ground potential to conductor IS1. When ground potential is applied to conductor IS1, the incoming distributor is controlled to advance to and assign the next succeeding link circuit to handle the next incoming call. When the incoming distributor advances, ground potential is removed from conductor IM1 and the emitters of transistors 907 and 908 so that those transistors are disabled from further operation.

Returning to the consideration of the time position store 1 circuit of Fig. 8, it can be seen that when transistors 805 and 806 become conductive responsive to the reading in of marking for time position channel 1, ground potential is applied to the emitter of transistor 807. The base of transistor 807 is individually connected to the time position 1 conductor TP1 and each time that a negative pulse appears on that conductor, transistor 807 is rendered conductive and a positive-going pulse is coupled through diode 808 to the base of pulse amplifier transistor 701. Diode 808 forms one input of a ten-input "or" gate for positive pulses and the particular time position pulse coupled through said gate is determined by the setting of the time position store circuits. As just described, when the flip-flop circuit in time position store 1 circuit is operated, the pulses coupled through the "or" gate occur in time position 1. As explained in the general description, the pulses appearing on conductors TP1–TP10, inclusive, occur at a frequency of 12 kc. and may be generated by any suitable pulse generator. Pulses appearing on conductors TP1–TP10 are graphically illustrated in Fig. 22.

The positive-going pulses in time position 1 coupled through diode 808 are utilized to render transistor 701 non-conductive and the resulting negative-going pulses at the collector of transistor 701 render transistor 702 conductive. The positive-going pulses at the collector of transistor 702 are coupled to the base of emitter follower transistor 703 and are repeated as positive-going pulses at the emitter of transistor 703 and applied to the cathode terminals of diodes 809 and 810, which are associated with highway selectors 1 and 2, respectively. Returning to the consideration of highway selector 1, it can be seen that when transistor 803 of the flip-flop circuit comprising transistors 803 and 804 become non-conductive responsive to the reading in of marking for highway 1, negative potential is applied to the base of transistor 811 to render that transistor conductive. Thus, ground potential is applied through resistor 812 to the base of transistor 813. Now when the emitter potential of transistor 703 rises to ground potential during time position 1, pulse amplifier transistor 813 is rendered conductive to transmit a negative pulse to the calling and called send and receive gates associated with highway 1. It is to be noted that the pulses appearing at the emitter of transistor 703 are blocked from the base of pulse amplifier 814 because of the non-conductivity of transistor 815. Thus, a negative pulse in time position 1 is applied to the calling and called send and receive gates associated with highway 1 in each frame of the recurring time position pulse frames for the duration of the call under consideration.

Examining the calling receive gate associated with highway 1, which gate is identical to the other calling and called receive gates, it can be seen that the gate comprises diodes 704 and 705. The cathode terminals of diodes 704 and 705 are returned to the collector of pulse amplifier transistor 813, which collector stands at plus six volt potential except during time position 1. During time position 1, the collector of transistor 813 drops to approximately minus six volt potential and diodes 704 and 705 are biased for conduction and pass any signals appearing on the upper pair of conductors of highway 1 and coupled through the hybrid circuit associated with highway 1. Similarly, the called receive gate 820 passes any signals appearing on the lower pair of conductors of highway 1 in time position 1 and coupled through the hybrid circuit associated with highway 1. The signal samples coupled through the receive gate diodes, such as 704 and 705, are amplified by push-pull connected, emitter follower transistor amplifiers, such as transistors 706 and 707 for the calling receive 1 gate, and applied to the input of amplifier 708. The received signal samples are amplified by a suitable amplifier 708 and detected and integrated by detector integrator 709, which may be identical to the detector integrators shown in the above-identified application. The resulting demodulated signals are passed through low-pass filter 710 to remove any 12 kc. signals, amplified by amplifier 711, and coupled by transformer 712 to the 1REC. conductors which extend to the coupling circuits associated with link circuit 1 at the various operator positions.

When the operator at one of the operator positions operates the answer key at that position, the send and receive conductors 1SD and 1REC. of the illustrated link circuit are cut through to that operator position by the link 1 coupling circuit at that position so that the answering operator may converse with the calling party. The answering operator's speech signals appearing on the calling 1SD conductors are amplified by push-pull connected, emitter follower amplifier transistors 713 and 714 and applied to the anode terminals of diodes 715 and 716 in the calling send 1 gate, which is identical to the remaining calling and called send gates. Since the cathode terminals of diodes 715 and 716 are returned to the collector of pulse amplifier transistor 813, these diodes are rendered conductive only during time position 1 in each pulse frame. The resulting signal samples coupled through diodes 715 and 716 are amplified by push-pull connected, emitter follower, amplifier transistors 717 and 718 and routed over the calling pair of SD1 conductors to the hybrid circuit for highway 1 and thus to the line terminating unit associated with the calling line.

Responsive to the operation of the answer key at the answering operator position and the resulting cut through of the coupling circuit at that position associated with the illustrated link circuit, a negative-going potential is applied to seize release conductor S–R1 in the coupling circuit. The negative-going potential swing on conductor S–R1 is coupled through capacitor 1014 and diode 1015 to reset the outgoing distributor control flip-flop circuit to the condition in which transistor 1003 is conductive. When transistor 1003 becomes conductive, ground potential is applied to conductor OS1 and the outgoing distributor is thereby controlled to advance one step and enable link circuit 2 for connection to an operator position. When the outgoing distributor advances, ground potential is removed from conductor OM1 and thus from the emitter of transistor 1005 and transistor 1005 becomes non-conductive. When transistor 1005 becomes conductive and non-conductive, transistor 1007 becomes conductive and negative potential is removed from the incoming lamp conductor IL in the illustrated link circuit. The negative-going potential swing on conductor S–R1 is also coupled through capacitor 1025 and diode 1026 to reset the link waiting control flip-flop circuit to the condition in which transistor 1023 is conductive. When transistor 1023 becomes conductive, transistors 1016 and 1017 become non-conductive and the link waiting lamp associated with link circuit 1 at each operator position is thereby extinguished.

In accordance with the oral instructions received from the calling party, the attendant keys the desired called number and then operates the end of selection key provided in the position circuit. As described in the general description, the register sender then sends a demand signal to the register finder. When the register finder seizes the register sender, the register sender transmits digit marking information corresponding to the first registered digit to the route selector which seizes an idle line terminating unit terminating a trunk line or radio link to the digit marking identified office. Simultaneously therewith, the register sender applies a negative potential through the coupling circuit associated with link circuit 1 at the answering operator position to read out conductor RO1 for the purpose of controlling the illustrated link circuit to read out highway and time position marking information to the highway and time position bus bars so that that information can be read into the line terminating unit selected by the route selector. This information is read into the called line terminating unit so that the calling and called line terminating units and the illustrated link circuit are all connected to time position 1 on highway 1. When negative potential is momentarily applied to conductor RO1, read out transistors 816 and 817 in highway selector 1 and time position store 1 circuit, respectively, are momentarily rendered conductive to apply ground potential through diodes 818 and 819 to conductors HW1 and TPM1, respectively. The read out transistors in the other highway selector and time position store circuits are prevented from becoming conductive since the emitter electrodes of those transistors are returned to a negative potential rather than to ground potential. The highway and time position information is read into the called unit in the exact same manner as previously described for the illustrated link circuit.

The register sender then alternately transmits voice frequency seize and compounded voice frequency digit designation signals over the called pair of 1SD conductors. Signals received over these conductors are amplified by amplifier 719, sampled by the called send 1 gate in time position 1, and the resulting signal samples are routed over the called pair of conductors SD1 to the hybrid circuit for highway 1 and thus to the called line terminating unit.

The answering operator may wish to release the circuits in the forward or called direction only if a wrong number is transmitted or if an all trunks busy condition is encountered. For this purpose, a forward release key at the operator position is operated to replace the negative potential normally appearing on conductor FR1 with ground potential. As long as conductor FR1 is returned to a negative potential and transistor 921 is therefore held conductive, the base of transistor 922 is clamped to ground potential through diode 923, and the negative pulses in time position 1 appearing at the collector of transistor 813 have no effect on transistor 922. However, when conductor FR1 is returned to ground potential and transistor 921 is therefore held non-conductive, each negative pulse appearing at the collector of transistor 813 renders transistor 922 conductive and positive-going pulses are applied to conductor LR1'. As explained in the general description, the pulses on conductor LR1' are inverted and amplified and routed to the highway 1 monitor circuit where they are utilized to release the circuits in the forward or called direction.

When the call has been answered at the distant office, the operator retires from the connection by restoring the answer key at the operator position. When the answer key is restored, the potential on conductor S-R1 returns to ground and the resulting positive-going potential swing is coupled through capacitor 1018 and diode 1019 to the base of transistor 1020. Transistors 1020 and 1021 comprise a monostable circuit in which transistor 1020 is normally conductive to apply ground potential to reset conductor RS and transistor 1021 is normally biased for non-conduction. When a positive-going pulse is coupled through diode 1019 to the base of transistor 1020, transistor 1020 is rendered non-conductive, negative potential is applied to reset conductor RS, and transistor 1021 is triggered conductive through capacitor 1022. Transistor 1021 remains conductive to maintain transistor 1020 non-conductive for the charge time of capacitor 1022 and the circuit then reverts to its normal condition. The negative pulse applied to conductor RS is used to reset all off-normal flip-flop and flip-flip circuits to their normal operated condition. Thus responsive to the restoration of the answer key, the illustrated link circuit is completely released and freed for use on another call.

*Position 1 link 1 coupling circuit*

A link coupling circuit, of the type shown in Fig. 13, is provided for each link circuit at each operator position. The conductors extending from link circuit 1 to the link coupling circuits are thus connected in multiple to a link coupling circuit at each operator position. Therefore, when a call on a particular link circuit is answered at one of the operator positions, it is necessary to inhibit the call coupling circuits corresponding to that link circuit at the other positions. Further, since a single answer key is provided at each operator position, it is necessary to inhibit all of the link coupling circuits at that position except the one corresponding to the enabled link circuit when the call on that link circuit is answered. The conductors, identified as I1-1, I1-2— I1-6, and I2-1 and shown at the right edge of Fig. 13, are provided for this purpose.

It will be recalled from the description of link circuit 1 that when link circuit 1 is enabled for connection to the operator position by the outgoing distributor, the incoming lamp at each operator position is illuminated under control of link circuit 1 and ground potential is applied to conductor LON1 in link circuit 1. Ground potential on conductor LON1 serves to enable the transistor corresponding to transistor 1301 in the link coupling circuit corresponding to link circuit 1 at each operator position for conduction. If the call is answered at operator position 1, negative potential is applied to conductor PKO1 and transistor 1301 in the illustrated coupling circuit is rendered conductive. When transistor 1301 becomes conductive, normally conductive transistor 1302 becomes non-conductive and transistor 1303 becomes conductive to apply ground potential to inhibit conductor I1-1. As fully explained in the general description, inhibit conductor I1-1 extends to the coupling circuits corresponding to link circuit 1 at each of the operator positions and to all of the other coupling circuits associated with operator position 1. In the position 2 link 1 coupling circuit, the ground potential on conductor I1-1 is coupled through a diode corresponding to 1304 in the illustrated coupling circuit to clamp the base of the transistor corresponding to 1301 in that circuit to ground potential and thus prevent that transistor from conducting when the answer key at position 2 is operated. Similarly, the ground potential on conductor I1-1 is coupled through a diode corresponding to 1305 in each of the other coupling circuits associated with operator position 1 to clamp the base of the transistor corresponding to 1301 in each of those coupling circuits to ground potential and thus prevent those transistors from becoming conductive when the link circuits corresponding thereto are enabled for connection to an operator position while the answer key at operator position 1 is in the operated condition.

Returning to the consideration of the illustrated link coupling circuit, it can be seen that when transistor 1302 becomes non-conductive, transistor 1306 becomes conductive and transistor 1307 is thereby rendered non-conductive to apply negative potential to the seize release conductor S-R1, which extends to link circuit 1. It will be recalled from the description of link circuit 1 that the application of negative potential to conductor S-R1 controls link circuit 1 to advance the outgoing distributor to enable link circuit 2 for connection to an operator position and also controls link circuit 1 to extinguish the link waiting lamp corresponding to link circuit 1 at each operator position. Also, when transistor 1302 becomes non-conductive and negative potential appears at its collector, transistors 1308 and 1309 are rendered conductive. Prior to the time that transistor 1309 becomes conductive, the gating diodes interposed in the connections between send conductors 1SD3 and 1SD and receive conductors 1REC and 1REC.3, respectively, are all biased in the reverse direction and thus block the transmission of signals between those respective conductors since the cathode terminals of said diodes are returned to plus twelve volt potential ppearing at the collector of non-conducting transistor 1309. When transistor 1309 becomes conductive and its collector potential drops to approximately minus six volts, the diodes are biased in the forward direction and the send and receive conductors 1SD and 1REC from link circuit 1 are effectively cut through to the send and receive conductors 1SD3 and 1REC.3, respectively, which extend to operator position 1. Thus, signals can now be transmitted between link circuit 1 and answering operator position 1.

At the end of the keying operation when the register sender at operator position 1 is seized by the register finder, negative potential is applied to read out conductor 1RO. In the illustrated circuit, when ground potential is removed from conductor 1RO and is, therefore, no longer coupled through diode 1311, transistor 1310 is rendered conductive from the negative potential appearing at the collector of non-conducting transistor 1302. When transistor 1310 becomes conductive, transistor 1312 is rendered non-conductive and negative potential is applied to conductor RO1, which extends to link circuit 1. As described in the description of link circuit 1, negative potential applied to conductor RO1 controls link circuit 1 to read out highway and channel marking information to the bus bars. Read out conductor 1RO is common to all of the link coupling circuits associated with operator position 1 but the negative potential applied thereto has no effect in the coupling circuits other than the illustrated link coupling circuit since the transistor corresponding to 1302 in each of those circuits is conductive and the transistor corresponding to 1310 is thus prevented from becoming conductive.

If the operator at operator position 1 desires to release the circuits in the forward or called direction, the forward release key at the operator position is operated to apply ground potential to conductor 1FR, which is connected to all of the link coupling circuits associated with operator position 1. Transistor 1313 in the illustrated link coupling circuit is rendered conductive when ground potential is applied to conductor 1FR and to its emitter since its base is returned to the negative potential at the collector of non-conducting transistor 1302. The transistor corresponding to 1313 in each of the other link coupling circuits associated with operator position 1 remains non-conductive because of the conduction of the transistor corresponding to 1302 in each of those circuits. When transistor 1313 in the illustrated circuit becomes conductive, ground potential is applied to conductor FR1 through diode 1314 and link circuit 1 is thereby controlled to transmit forward release pulses in the assigned time position to the highway monitor circuit associated with the assigned highway, as previously described. Ground potential appearing at the collector of conducting transistor 1313 is also applied to the base of normally conducting transistor 1315 to render that transistor non-conductive. When transistor 1315 becomes non-conductive, negative potential is applied to register release conductor 1RR, which extends to register sender 1, for the purpose of resetting the digit registering circuits of the register sender to normal. When the forward release key is restored, transistor 1313 becomes non-conductive and transistor 1315 becomes conductive.

When the call is answered in the distant office, the operator retires from the connection by restoring the answer key at operator position 1. When the answer key is restored, ground potential is applied to conductor PKO1, transistor 1301 becomes non-conductive, and transistor 1302 becomes conductive. When transistor 1302 becomes conductive, transistor 1306 becomes non-conductive and transistor 1307 becomes conductive to apply ground potential to conductor S-R1 and thereby initiate the release of link circuit 1. Also, when transistor 1302 becomes conductive, transistors 1308 and 1309 become non-conductive and transmission of signals between link circuit 1 and operator position 1 is effectively blocked. Transistor 1303, of course, becomes non-conductive when transistor 1302 becomes conductive and inhibiting ground potential is thereby removed from conductor I1-1. When link circuit 1 is released, ground potential is removed from conductor LON1 in that circuit and transistor 1301 in the illustrated circuit is no longer enabled for operation.

*Operator position circuit 1*

The operator position circuit, which is shown in Figs. 15 and 16, comprises a single answer key, a single incoming lamp, a call waiting lamp for each link circuit of the system, and a call waiting recall lamp. As previously described, the call waiting lamp corresponding to each link circuit is illuminated upon the completion of a connection between that link circuit and a calling one of the lines, while the incoming lamp conductor IL is common to all of the link circuits and potential is applied thereto under control of each link circuit in turn as said link circuits are enabled for connection to an operator position. The call waiting lamp corresponding to each link circuit is extinguished when the call on that link circuit is answered by any one of the operator positions so that an indication of the number of link circuits awaiting answering is given to each operator position. Also as previously described, the incoming lamp is steadily illuminated when a link circuit is enabled for connection to an operator position but is controlled to flash when the recall link circuit is enabled for connection to an operator position.

When a connection is completed between a calling line and link circuit 1, link circuit 1 functions to apply negative potential to conductor LW1 and thus to the base of emitter follower transistor 1601. The resulting negative potential appearing at the emitter of transistor 1601 is applied to the base of transistor 1602 to render that transistor conductive and thus illuminate lamp CWL1. Similarly, as calls are completed to the other link circuits, lamps CWL2-CWL6 are also illuminated. When any one of the link circuits is enabled for connection to an operator position for answering, negative potential appears on conductor IL and, assuming that none of the previously established connections between calling and called lines are attempting to recall an operator, transistors 1501 and 1502 are rendered conductive, the emitter of emitter follower transistor 1503 goes negative, and transistor 1504 is rendered conductive to illuminate the incoming lamp.

In response to the illumination of the incoming lamp, the operator operates answer key 1603 to the position wherein negative potential is applied to position key conductor PK1. As previously described, the negative potential on conductor PK1 is coupled through the recall coupling circuit associated with operator position 1 to the link coupling circuits associated with operator position 1 and is effective in the coupling circuit corresponding to the link circuit enabled for connection to control that coupling circuit to cut through the send and receive conductors of that link circuit to send and receive conductors 1SD3 and 1REC.3, respectively, shown at the upper left of Fig. 15. When the call on the enabled link circuit is answered, negative potential is removed from conductor IL but if another call is awaiting answering, negative potential is reapplied to conductor IL by the next enabled link circuit. The incoming lamp is not illuminated in the illustrated position circuit because of the operated condition of the answer key but the incoming lamp in each of the other operator position circuits is illuminated and the call can be answered at any one of those positions.

Speech or any other voice frequency signals received from either a calling or a called line terminating unit by the answered link circuit are routed through the cut-through link coupling circuit and appear on the receive conductors 1REC.3. Signals appearing on conductors 1REC.3 are amplified by push-pull connected, emitter follower transistors 1505 and 1506 and coupled to the operator's receiver. Signals appearing on conductors 1REC.3 are also amplified by push-pull connected, emitter follower transistors 1604 and 1605 and coupled over conductors 1REC.4 to a multifrequency receiver in the register sender associated with operator position 1. The multifrequency receiver in the register sender is designed to detect seize acknowledge, digit acknowledge, and dial tone voice frequency signals which indicate the progress of the call, as fully described in the above-identified co-pending application.

Talking battery is supplied to the operator's transmitter from the negative potential normally appearing at the emitter of emitter follower transistor 1507, as will be described more fully hereinafter, and through choke coil 1508. Speech signals are coupled from the operator's transmitter through capacitor 1509 to the calling pair of send conductors 1SD3 by push-pull connected, emitter follower, amplifier transistors 1510 and 1511. Speech signals coupled through capacitor 1509 are also coupled to the called pair of send conductors 1SD3 by the resistor hybrid network 1512 and push-pull connected, emitter follower, amplifier transistors 1513 and 1514. Digit designation signals in the form of compound voice frequency signals, and such voice frequency supervisory signals as seize and cancel signals transmitted by the register sender over send conductors 1SD4, are also coupled through resistor hybrid network 1512 to amplifier transistors 1513 and 1514 and thus to the called pair of send conductors 1SD3.

Routing information is keyed into the register sender by the operation of the digit keys corresponding to the digits "1-0" on a one at a time basis. The operation of any one of the digit keys results in the application of minus twelve volt potential to a unique combination of two out of the five conductors 1KS1-1KS5. For example, the operation of digit key 1 results in the application of minus twelve volt potential through diode 1606 to conductor 1KS1 and through diode 1607 to conductor 1KS2, while the operation of digit key 0 results in the application of minus twelve volt potential through diode 1608 to conductor 1KS4 and through diode 1609 to conductor 1KS5. The end of the keying operation is indicated to the register sender by the application of minus twelve volt potential to conductor ES when the end of selection key is operated.

Cancellation of registered information before the end of selection key is operated is accomplished by the operation of the cancel key to apply minus twelve volt potential to conductor 1 cancel, which extends to the register sender. If the operator wishes to release all of the circuits in the forward or called direction after the register sender has started to transmit digit information, the forward release key 1610 is operated to apply ground potential to conductor 1FR, which extends to the call coupling circuits associated with operator position 1.

During the sending operation, negative potential is applied to microphone inhibit conductor 1MI by the register sender to render transistor 1611 conductive. When transistor 1611 becomes conductive, transistors 1612 and 1613 are rendered non-conductive and negative potential is thereby removed from the emitter of emitter follower transistor 1507. Talking battery is removed from the operator's transmitter during the sending operation since any background noise introduced at said transmitter might falsely operate the voice guard circuits associated with the multifrequency receivers in incoming registers at distant offices and thus prevent the registration of the transmitted digit designation information.

When a recall signal is detected on one of the time position channels of the transmission highway networks, the recall link circuit is connected to that channel and is immediately enabled for connection to the operator positions. When a connection is completed from the channel desiring recall service to the recall link circuit, negative potential is applied to conductor RIL in the recall link circuit and transistor 1515 becomes conductive. When transistor 1515 becomes conductive, ground potential is applied to the emitter of transistor 1516 and transistor 1516 is thereafter rendered conductive by each negative pulse appearing on conductor 60 I.P.M. Each positive pulse appearing at the collector of transistor 1516 serves to render transistor 1517 conductive and the resulting negative pulses appearing at the collector of transistor 1517 are repeated at the emitter of transistor 1614 to render transistor 1615 conductive and thus flash the call waiting lamp, CW recall. The positive pulses appearing at the collector of transistor 1516 are also coupled through diode 1518 to render transistors 1502, 1503, and 1504 conductive to flash the incoming lamp. It is to be noted that if an enabled link circuit is awaiting answering, as indicated by a steadily illuminated incoming lamp, at the time that a connection is completed to the recall link circuit, the steadily illuminated lamp is immediately changed to a flashing lamp to indicate to the operator that a recall is next to be answered. For this purpose, the ground potential appearing at the collector of conducting transistor 1515 is coupled through diode 1519 to hold transistor 1501 non-conductive regardless of whether or not negative potential is applied to conductor IL.

When the answer key 1603 is operated to answer a recall, negative potential is applied to conductor PK1, the recall link coupling circuit associated with operator position 1 cuts through the send and receive conductors from the recall link circuit to send and receive conductors 1SD3 and 1REC.3, respectively. Subsequent operation in the illustrated circuit is exactly the same as that just described for the answering of a call on a link circuit.

*Recall link circuit*

A single recall link circuit, of the type shown in Figs. 11 and 12, is provided in the system and, as explained in the general description, the purpose of the recall link circuit is to provide the operator positions access to any one of the time position channels on any one of the highways when recall signals appear on those channels. The recall link circuit comprises a multifrequency receiver circuit 1101 which, under control of the recall scan control circuit 42, is connected to each of the channels in succession for the purpose of detecting recall signals appearing on said channels. As explained in the general description, the recall scan control circuit 42 serves to apply a D.-C. marking potential to one of the two conductors RSHW1 and RSHW2 of the recall highway bus bars RWHBB while D.C. marking potentials are applied to the conductors RSTP1–RSTP10 of the recall time position bus bars RTPBB in successive order. Assume that time position channel 1 on highway 1 is marked by the recall scan control circuit by the application of ground potential to conductors RSHW1 and RSTP1, respectively. Ground potential on conductor RSTP1 is applied to the emitter of transistor 1201 and transistor 1201 is rendered conductive by each negative pulse occurring on its individual time position conductor TP1 and coupled to its base while ground potential is applied to its emitter. The distributor in recall scan control circuit is controlled to step at a relatively slow rate as compared to the multiplex generator so that a number of time position 1 pulses appear on conductor TP1 while ground potential is applied to conductor RSTP1 and thus to the emitter of transistor 1201. The positive-going pulses in time position 1 appearing at the collector of transistor 1201 are coupled through diode 1202, which forms one input of a ten-input "or" gate for positive pulses, to the base of pulse amplifier transistor 1102. The negative pulses appearing at the collector of transistor 1102 are repeated as negative pulses at the emitter of emitter follower transistor 1103 and are applied to the base electrodes of highway marking transistors 1203 and 1204. Since it was assumed that highway marking conductor RSHW1 has ground potential applied thereto at this time, each negative pulse appearing at the emitter of transistor 1103 serves to render transistor 1203 conductive while transistor 1204 remains non-conductive since conductor RSHW2, and thus its emitter, are returned to negative potential in the recall scan control circuit.

The positive-going pulses in time position 1 appearing at the collector of transistor 1203 are applied to the base of transistor 1104 and the resulting negative-going pulses at the collector of transistor 1104 are coupled to the calling and called send and receive gates associated with highway 1. The calling and called send and receive gates, shown at the top of Fig. 11, are identical to the calling and called send and receive gates shown in detail and described in conjunction with link circuit 1. Each negative-going pulse appearing at the collector of transistor 1104 serves to open gates called send 1, calling send 1, called receive 1, and calling receive 1. Any signals appearing on either the calling or called pairs of conductors REC.1 in time position 1 are thus coupled to the input of amplifier 1105. The amplified signal samples appearing at the output of amplifier 1105 are detected and integrated in detector integrator 1106, and the resulting demodulated signals are passed through low-pass filter 1107 to remove any 12 kc. signal. The demodulated signals are then amplified by amplifier 1108, and coupled through transformer 1109 to conductors RREC, which extend to the recall link coupling circuits. The demodulated signals coupled to conductor RREC are also coupled to and amplified by emitter follower transistors 1110 and 1111 and applied to the input of recall detector 1101. Recall detector 1101 may be of any conventional type and is equipped with a suitable voice guard circuit so that an output is realized from said detector only when the particular frequencies to which it is responsive are received.

It should now be obvious that recall detector 1101 is effectively connected to each of the ten time position channels on highway 1 in turn, and is then effectively connected to each of the ten time position channels on highway 2 in turn in a repeating sequence. If a recall signal comprising frequencies U and W, which may be 900 and 1300 c.p.s., respectively, is detected on any one of the channels, a positive potential appears on output conductors U and W from detector 1101 and normally conductive transistors 1112 and 1113 are both rendered non-conductive. It is to be noted that the transmission of recall signals is usually initiated by the calling party either by the operation of a recall button at the subscriber station or by the flashing of the hookswitch associated with said substation. When transistors 1112 and 1113 both become non-conductive, negative potential is coupled through diode 1114 to trigger the recall-on flip-flop circuit to the condition in which transistor 1205 is conductive and transistor 1206 is non-conductive. When transistor 1206 becomes non-conductive, negative potential is applied to conductor STOP and the recall scan control circuit is thereby controlled to arrest its stepping operation so that the highway and time position marking conductors corresponding to the channel on which a recall signal is detected remain energized and the recall link circuit therefore remains connected to that channel. It is to be noted that when the recall signal on the seized channel terminates and transistors 1112 and 1113 again become conductive, the recall-on flip-flop circuit is not reset since diode 1114 is biased in the reverse direction and the positive potential swing at the collectors of transistors 1112 and 1113 is not coupled to the base of transistor 1205. Also when transistor 1206 of the recall-on flip-flop circuit becomes non-conductive, negative potential is applied to conductor RON, which extends to the recall link coupling circuits at the various operator positions, to enable said recall link coupling circuits for operation as will be more fully described in conjunction with the recall link coupling circuit. When transistor 1205 of the recall-on flip-flop circuit becomes conductive, the positive-going potential swing at its collector is coupled through capacitor 1207 and diode 1208 to trigger the recall incoming lamp control flip-flop circuit to the condition in which transistor 1209 is non-conductive and transistor 1210 is conductive. When transistor 1209 becomes non-conductive, negative potential is applied to recall incoming lamp conductor RIL. As described in conjunction with the operator position circuit, the application of negative potential to conductor RIL serves to control the incoming lamp at each operator position to flash and thus indicate that a recall is awaiting answering.

When the call on the recall link circuit is answered at any one of the operator positions, the potential on recall seize release conductor RS-R goes from ground to a negative value and transistor 1210 is thereby rendered non-conductive to reset the recall incoming lamp control flip-flop circuit and remove potential from conductor RIL. When the call is answered, the recall link coupling circuit associated with the answering operator position is controlled to cut through the send and receive conductors RSD and RREC from the illustrated link circuit to the send and receive conductors, respectively, which extend to that operator position circuit. Signals received over the calling pair of send conductors RSD from the operator position circuit are amplified by amplifier 1115 and, assuming for purposes of illustration that time position channel 1 on highway 1 is seized, sampled in time position 1 by the calling send 1 gate. The resulting signal samples appearing at the output of calling send 1 gate are applied to the calling pair of conductors SD1 and routed through the hybrid circuit for highway 1 to the calling party. Similarly, signals received over the called pair of send conductors RSD from the operator position circuit are amplified by amplifier 1116 and sampled in time position 1 by the called send 1 gate. The resulting signal samples appearing at the output of called send 1 gate are applied to the called pair of conductors SD1 and routed through the hybrid circuit for highway 1 to the circuits in the called direction.

The answering operator converses with the recalling party and if a new connection is desired, keys the desired called numer and then operates the end of selection key provided in the position circuit. When the register sender is seized by the register finder, the register sender transmits digit marking information corresponding to the first registered digit to the route selector which seizes an idle line terminating unit terminating the trunk line or radio link to the office identified by said digit marking. Simultaneously therewith, the register sender applies a negative potential through the recall link coupling circuit at the answering operator position to read out conductor RRO for the purpose of controlling the recall link circuit to read out highway and time position marking information to the highway and time position bus bars so that that information can be read into the line terminating unit selected by the route selector. This information is read into the called line terminating unit so that the calling and called line terminating units and the recall link circuit are all connected to time position 1 on highway 1. When negative potential is momentarily applied to read out conductor RRO, read out transistors 1211 and 1212 in highway selector 1 and time position 1 circuit, respectively, are momentarily rendered conductive to apply ground potential to conductors HW1 and TPM1, respectively. The read out transistors in the other highway selector and time position circuits are prevented from becoming conductive since the emitter electrodes of those transistors are returned to a negative potential in the recall scan control circuit.

The answering operator may wish to release the circuits in the forward or called direction only if a wrong number is transmitted or if an all trunks busy condition is encountered. When the forward release key at the operator position is operated, ground potential is applied to conductor RFR and transistor 1117 is rendered non-conductive. When transistor 1117 is non-conductive, the base of transistor 1213 is no longer clamped to ground through diode 1118, each negative pulse appearing at the collector of transistor 1104 renders transistor 1213 conductive, and positive-going pulses are applied to conductor LR1'. As previously explained, the pulses on conductor LR1' are inverted and amplified and routed to the highway 1 monitor circuit where they are utilized to release the circuits in the forward or called direction.

When the recall has been completed, the operator retires from the connection by restoring the answer key at the operator position. When the answer key is restored, the recall link coupling circuit is released and the potential on conductor RS-R returns to ground. The positive-going potential swing on conductor RS-R is coupled through capacitor 1214 and diode 1215 to the base of transistor 1216. Transistors 1216 and 1217 comprise a monostable circiut which transistor 1216 is normally conductive to apply ground potential to the emitter of transistor 1205 and transistor 1217 is normally biased for non-conduction. When a positive-going pulse is coupled through diode 1215 to the base of transistor 1216, transistor 1216 is rendered non-conductive, negative potential is applied to the emitter of transistor 1205, and transistor 1217 is triggered conductive through capacitor 1218. Transistor 1217 remains conductive to maintain transistor 1215 non-conductive for the charge time of capacitor 1218 and the circuit then reverts to its normal condition. The negative pulse applied to the emitter of transistor 1205 serves to reset the recall-on flip-flop circuit to the condition in which transistor 1206 is conductive. When the recall-on flip-flop circuit is reset, negative potential is removed from conductor STOP and the recall scan control circuit is thereby enabled to resume its stepping operation.

*Position 1 recall link coupling circuit*

A recall link coupling circuit, of the type shown in Fig. 14, is provided for the recall link circuit at each operator position. The conductors extending from the recalle link circuit are thus connected in multiple to a recall link coupling circuit at each operator position. Therefore, when a recall is answered at one of the operator positions, it is necessary to inhibit the recall link coupling circuits at the other positions from operation. In the illustrated system, inhibit conductors RI1 and RI2 are provided for that purpose.

It will be recalled from the description of the recall link circuit that when the recall link circuit seizes a recalling channel, the incoming lamp at each operator position not already engaged in answering a call is flashed and negative potential is applied to conductor RON in the recall link circuit. Negative potential on conductor RON serves to render conductive the transistor corresponding to transistor 1401 in each of the recall link coupling circuits associated with operator positions not already engaged in answering a call. It will be recalled from the general description that the recall link circuit is given answering priority over the link circuits by the expedient of connecting the position key conductor, such as PK1 for operator position 1, through the recall link coupling circuit at that position to the position key out conductor, such as PKO1 for operator position 1, which extends to the other coupling circuits at that position. It will also be recalled from the general description that if a call on one of the link circuits is answered before a recall signal is detected and potential is already applied to conductor PK1 at the time that the recall link circuit applies potential to conductor RON, the recall link coupling circuit continues to couple the potential on conductor PK1 to conductor PKO1 so that the previously answered call is not released.

To illustrate the difference in operation when the above described conditions obtain, first assume that negative potential is applied to conductor PK1, thus indicating that operator position 1 is engaged in answering a call, at the time that negative potential is applied to conductor RON. Negative potential on conductor PK1 serves to hold transistor 1402 conductive and transistor 1403 non-conductive so that negative potential appearing at the collector of transistor 1403 is coupled over conductor PKO1 to the link coupling circuits associated with operator position 1. The ground potential appearing at the collector of transistor 1402 is coupled through diode 1404 to the base of transistor 1401 and thus prevents that transistor from becoming conductive when negative potential is applied to conductor RON. Thus, the application of negative potential to conductor RON has no effect on the illustrated circuit when the answer key at operator position 1 is already in the operated condition. Ground potential coupled through diode 1404 is also coupled through diode 1405 to the base of transistor 1406 to prevent the conduction of that transistor when the operator at operator position 1 is answering a call on one of the link circuits.

Next assume that the answer key at operator position 1 is not in the operated condition at the time that negative potential is applied to conductor RON. Under these conditions, transistor 1401 becomes conductive and ground potential appearing at its collector is coupled through diode 1407 to the base of transistor 1402 to prevent that transistor from becoming conductive when and if the recall is answered at operator position 1. Next assume that the operator at operator position 1 operates the answer key at that position to answer the recall. Negative potential applied to conductor PK1 serves to render transistor 1406 in the illustrated circuit conductive while transistor 1402 in the illustrated circuit remains non-conductive because of the application of ground potential through diode 1407, as previously described. When transistor 1406 becomes conductive, ground potential is applied to inhibit conductor RI1, which extends to the recall link coupling circuits at the other operator positions, and is coupled through a diode corresponding to 1408 in each of those circuits to maintain the transistor corresponding to 1401 in each of those circuits non-conductive. Thus, when the recall is answered at one of the operator positions, the other operator positions are inhibited from handling the recall and are effectively freed to answer calls occurring on the link circuits.

Returning to the consideration of the illustrated circuit, it can be seen that when transistor 1406 becomes conductive, normally conductive transistor 1409 is rendered non-conductive, transistor 1410 becomes conductive, and transistor 1411 is rendered non-conductive to apply negative potential to the seize release conductor R–SR, which extends to the recall link circuit. It will be recalled from the description of the recall link circuit that the application of negative potential to conductor R–SR controls that circuit to extinguish the incoming lamp and the recall link waiting lamp at each of the operator positions. Also, when transistor 1409 becomes non-conductive and negative potential appears at its collector, transistors 1412 and 1413 are rendered conductive. Prior to the time that transistor 1413 becomes conductive, the gating diodes interposed in the connections between send conductors 1SD3 and RSD and receive conductors RREC and 1REC.3, respectively, are all biased in the reverse direction and thus block the transmission of signals between those respective conductors since the cathode terminals of said diodes are returned to plus twelve volt potential at the collector of non-conducting transistor 1413. When transistor 1413 becomes conductive and its collector potential drops to approximately minus six volts, the gating diodes are biased in the forward direction and the send and receive conductors RSD and RREC from the recall link circuit are effectively cut through to the send and receive conductors 1SD3 and 1REC.3, respectively, which extend to operator position 1. Signals can now be transmitted between the recall link circuit and answering operator position 1.

At the end of the keying operation when the register sender at operator position 1 is seized by the register finder, negative potential is applied to read out conductor 1RO. In the illustrated circuit, when ground potential is removed from conductor 1RO and is, therefore, no longer coupled through diode 1414, transistor 1415 is rendered conductive from the negative potential appearing at the collector of non-conducting transistor 1409. When transistor 1415 becomes conductive, transistor 1416 is rendered non-conductive and negative potential is applied to conductor RRO, which extends to the recall link circuit. As described in the description of the recall link circuit, negative potential applied to conductor RRO controls the recall link circuit to read out highway and channel marking information to the bus bars. Read out conductor 1RO is common to the recall link coupling circuit and to all of the link coupling circuits associated with operator position 1 but the negative potential applied thereto has no effect in the link coupling circuits since the transistor corresponding to 1409 in each of those circuits is conductive and the transistor corresponding to 1415 is thus prevented from becoming conductive.

If the operator at operator position 1 wishes to release the circuits in the forward or called direction, the forward release key at the operator position is operated to apply ground potential to conductor 1FR, which is connected to the illustrated circuit and to all of the link coupling circuits associated with operator position 1. Transistor 1417 in the illustrated circuit is rendered conductive when ground potential is applied to conductor 1FR and to its emitter since its base is returned to the negative potential at the collector of non-conducting transistor 1409. The transistor corresponding to 1417 in the link coupling circuits associated with operator position 1 remains non-conductive because of the conduction of the transistor corresponding to 1409 in each of those circuits. When transistor 1417 becomes conductive, ground potential is applied to conductor RFR through diode 1418 and the recall link circuit is thereby controlled to transmit forward release pulses in the assigned time position to the highway monitor circuit associated with the assigned highway, as previously described. Ground potential appearing at the collector of conducting transistor 1417 is also applied to the base of normally conducting transistor 1419 to render that transistor non-conductive. When transistor 1419 becomes non-conductive, negative potential is applied to register release conductor 1RR, which extends to register sender 1, for the purpose of resetting the digit registering circuits of the register sender to normal. When the forward release key is restored, transistor 1417 becomes non-conductive and transistor 1419 becomes conductive.

The answering operator retires from the connection by restoring the answer key at operator position 1. When the answer key is restored, ground potential is applied to conductor PK1, transistor 1406 becomes non-conductive, and transistor 1409 becomes conductive. When transistor 1409 becomes conductive, transistor 1415 becomes non-conductive and transistor 1416 becomes conductive to apply ground potential to conductor R–SR and thereby initiate the release of the recall link circuit. Also when transistor 1409 becomes conductive, transistors 1412 and 1413 become non-conductive and transmission of signals between the recalling link circuit and operator position 1 is effectively blocked. Also when transistor 1406 becomes non-conductive, inhibiting ground potential is removed from conductor RI1. When the recall link circuit is released, negative potential is removed from conductor RON in that circuit and transistor 1401 in the illustrated circuit is rendered non-conductive and the circuit is fully released.

Incoming distributor

The incoming distributor, which is shown in Fig. 17, is provided in the system for the purpose of assigning the operator link circuits for use in turn. The incoming distributor comprises a free running ring circuit having an odd number plurality of stages and a gating transistor for each stage where an output is desired. Since six operator link circuits are provided in the illustrated system, the incoming distributor comprises six gating circuits corresponding to the link circuits, an all links busy gating circuit, and a seven-stage ring circuit for controlling the gate circuits.

The ring circuit comprises a single transistor, such as transistor 1701, in each stage. The collector of the transistor in each stage is D.-C. connected to the base of the next succeeding transistor of the ring circuit and since an odd number plurality of ring circuit stages is provided, no stable condition is possible in the ring circuit. During each cycle of operation of the ring circuit, the state of conduction of each transistor is changed from either conductive to non-conductive or from non-conductive to conductive. The speed of operation of the ring circuit is dependent upon the capacitance value of the capacitors, such as 1702, provided in the ring circuit and the type of transistors used in the circuit.

In order to provide a useful, progressive, non-overlapping output from the ring circuit, a gating transistor, such as 1703, is provided in each stage where an output is desired. Each of the gating transistors is connected with its base to the collector of one of the ring circuit transistors and with its emitter to the collector of an even numbered transistor following said one transistor in the ring circuit. The collectors of the two aforementioned ring circuit transistors are normally at the same potential, either ground or negative potential. In either case, the gating transistor is biased for non-conduction. On alternate cycles of operation of the ring circuit when the potential at the collectors of the aforementioned ring circuit transistors is changing from ground to negative potential, the gating transistor is biased for conduction when the collector of said one transistor is at negative potential and the collector of the second transistor is still at ground potential.

To illustrate the above described gating operation, it can be seen that the base electrode of gating transistor 1703 is connected to the collector of the transistor in stage 6 of the ring circuit while the emitter electrode of transistor 1703 is connected to the collector of transistor 1701 in stage 1 of the ring circuit. If it is assumed that the ring circuit transistors in stages 1 and 3 are conductive and that the transistor in stage 5 has just started to conduct, it can be seen that the transistor in stage 6 of the ring circuit becomes non-conductive and negative potential is applied to the cathode terminal of diode 1704 in the base circuit of transistor 1703. Now, if negative potential is applied to conductor IS4 in link circuit 4, thus indicating that link circuit 4 is idle and available for use, transistor 1703 is rendered conductive to apply ground potential to marking conductor IM4, which extends to link circuit 4, and thus enable link circuit 4 for operation. Simultaneously therewith, ground potential is applied through diode 1705 to the base of the transistor in stage 7 of the ring circuit to arrest the operation of the ring circuit in the condition in which the transistors in stages 1, 3, and 5 are conductive and the transistors in stages 2, 4, 6, and 7 are non-conductive.

When a connection has been completed from a calling line to link circuit 4, ground potential is applied to conductor IS4 in link circuit 4, as previously described, transistor 1703 becomes non-conductive, and the ground clamping through diode 1705 to the ring circuit is removed. Since the transistor in stage 6 is non-conductive, the transistor in stage 7 becomes conductive and transistor 1701 in stage 1 becomes non-conductive. When transistor 1701 becomes non-conductive, the transistor in gating stage 5 is rendered conductive if link circuit 5 is idle, ground potential is applied to marking conductor IM5, and the operation of the ring circuit is arrested by ground clamping through diode 1706 to the base of transistor in stage 2 of the ring circuit. The link circuits 1–6 are assigned for use in numerical order in the manner just described. Under normal circumstances, the calls completed to the link circuits will be answered at the operator positions as fast as they are completed to the link circuits. However, it may happen under certain conditions that all of the link circuits have calls completed thereto and said calls are either in the process of being answered or are awaiting answering, as indicated by the application of ground potential to the individual seize conductors for the link circuits.

All links busy transistor 1713 is held conductive through one or more of the diodes 1707–1712, inclusive, whenever one or more of the link circuits is idle to thereby apply ground potential through a diode corresponding to diode 1704 to hold the base of the transistor corresponding to transistor 1703 in gating stage 7 at ground potential and thus prevent the ring circuit from stopping in the position in which the transistor in gating stage 7 is held conductive. However, when all of the link circuits are busy, the transistor 1713 becomes non-conductive and the ring circuit is controlled to arrest its operation in the position in which the transistor in gating stage 7 is held conductive to apply ground potential to all links busy conductor ALB, which extends to the route selector. When the call on link circuit 1 is further extended and the answering operator retires from the connection, negative potential is applied to conductor IS1, transistor 1713 becomes conductive through diode 1708, and the ring circuit is advanced to assign link circuit 1 for use and the operation then continues, as previously described.

Outgoing distributor

The operation of the outgoing distributor, which is shown in Fig. 18, is identical to the operation of the incoming distributor, just described, with the exception that an all links busy gating position is not provided. It will be recalled that each of the link circuits is controlled to apply negative potential to its individual seize conductor as soon as that link circuit is assigned for use by the incoming distributor and to apply ground potential to said seize conductor when the answering operator retires from the connection and thereby frees the link circuit for use on another call. Thus, one of the gating stages of the outgoing distributor is always energized by the ring circuit in the outgoing distributor and the ring circuit is controlled to advance and mark the next link circuit as soon as the answering operator retires from the connection to a previously answered link circuit. Since the six link circuits provided in the illustrated system are assigned for use in numerical order by the incoming distributor and since the outgoing distributor enables said link circuits for connection to an operator position in the same numerical order, it should be obvious that calls are answered in the same sequence that they are completed to the link circuits.

*Recall scan control circuit*

It will be recalled from the general description that the recall scan control circuit, which is shown in Figs. 19 and 20, is provided in the system for the purpose of controlling the connection of the multifrequency recall detector in the recall link circuit to each of the time position channels of each of the transmission highway networks in turn. It can be seen that the recall scan control circuit comprises an eleven-stage free running time position selecting ring circuit, identical to the incoming distributor ring circuit, eleven gating stages, and a highway selector flip-flop circuit. A flip-flop circuit is provided since the illustrated system comprises but two highways. If more highways are required, a ring circuit is, of course, provided in the recall scan control circuit for selecting said highways.

To illustrate the operation of the circuit, assume that transistor 2001 is conductive and that transistor 2002 is non-conductive. Ground potential is therefore applied to conductor RHW1 of the highway marking bus bar RHWBB to identify highway 1 to the recall link circuit. The ring circuit of the recall scan control circuit serves to render the transistor corresponding to transistor 1901 in each of the gating stages conductive in numerical order from one to eleven so that ground potential is applied to conductors RTPM1–RTPM10 in numerical order to mark time position channels one to ten in numerical order to the recall link circuit. The normally conductive transistor corresponding to transistor 1902 in each gating circuit becomes non-conductive when the transistor corresponding to transistor 1901 in that circuit becomes conductive but without effect as long as ground potential is applied to conductor STOP in the recall link circuit, thus indicating that a recall signal has not been detected on any of the scanned time position channels.

When the transistor corresponding to 1901 in gating stage 11 is rendered conductive, the positive-going potential at its collector is coupled through capacitor 2003 and steering diode 2004 to trigger transistor 2001 non-conductive and transistor 2002 conductive and thus apply marking ground potential to conductor RHW2. Thus, it can be seen that ground potential is applied to the conductors RTPM1–RTPM10, in turn, while ground potential is applied to conductor RHW1 and that ground potential is then applied to conductors RTPM1–RTPM10, in turn, while ground potential is applied to conductor RHW2. The above described operation continues in a repeating sequence until a recall signal is detected on one of the channels.

When a recall signal is detected on one of the channels, the recall link circuit functions to apply negative potential to conductor STOP for the purpose of arresting the stepping operation of the ring circuit of the recall scan control circuit in the position in which the channel on which the recall signal is detected is continuously marked to the recall link circuit. To illustrate this operation, assume that transistors 2001 and 1901 are conductive to thus mark time position channel 6 of transmission highway 1 to the recall link circuit. Next assume that a recall signal is detected on channel 6 of highway 1 so that the recall link circuit functions to apply negative potential to conductor STOP. It can be seen that the base of transistor 1901 is returned to the collector of the transistor in ring circuit stage 10 while its emitter is returned to the collector of transistor 1903 in ring circuit stage 1 so that the operation of the ring circuit must be arrested in the position in which transistor 1903 is conductive and the transistor corresponding to 1903 in stage 10 is non-conductive. Inasmuch as transistor 1902 of gating stage 1 is non-conductive at this time and since the anode terminal of diode 1905 is returned to negative potential in the recall link circuit over conductor STOP, negative potential is applied through diode 1904 to the base of transistor 1903 in ring circuit stage 1 to hold that transistor conductive. The operation of the ring circuit is thus arrested in the position in which the transistors in the odd numbered stages are conductive and the transistors in the even numbered stages are non-conductive. Since the ring circuit stage 1 transistor is conductive and the ring circuit stage 10 transistor is non-conductive, gating transistor 1901 is held conductive and ground potential is applied to time position marking conductor RTPM6 to continuously mark that time position to the recall link circuit.

When the recall has been answered and the answering operator retires from the connection to release the recall link circuit, ground potential is applied to conductor STOP in the recall link circuit, diode 1904 is thereby biased in the reverse direction, transistor 1903 becomes non-conductive, and the recall scan control ring circuit resumes its stepping operation. Obviously, the ring circuit of the recall scan control circuit can be stopped in any position to continuously mark a time position channel and a highway transmission network to the recall link circuit in the exact same manner as just described.

While there has been shown and described what is at present considered to be the preferred embodiment of the invention, modifications thereto will readily occur to those skilled in the art. It is not desired, therefore, that the invention be limited to the embodiment shown and described and it is intended to cover in the appended claims all such modifications as fall within the true spirit and scope of the invention.

What is claimed is:

1. In a telephone system, a plurality of lines, a multichannel transmission network interconnecting said lines, an operator position, means for individually assigning said channels to calling ones of said lines, means at said operator position for controlling selected called ones of said lines to seize said channels to thereby complete connections between calling and called ones of said lines, means for transmitting recall signals over said lines, means for scanning said channels for recall signals, and means responsive to the detection of a recall signal on any one of said channels for connecting said operator position to that channel.

2. In a telephone system, a plurality of lines, an operator position, an operator recall link circuit, a multichannel transmission network interconnecting said lines and said recall link circuit, means for individually assigning said channels to calling ones of said lines, means at said operator position for controlling selected called ones of said lines to seize said channels to thereby complete connections between calling and called ones of said lines, means for transmitting recall signals over said lines, means for scanning said channels for recall signals, means responsive to the detection of a recall signal on any one of said channels for controlling said recall link circuit to seize that channel, and means at said operator position for performing an answering operation on said recall link circuit.

3. In a telephone system, a plurality of lines, a plurality of operator positions, a recall link circuit common to said operator positions, a multichannel transmission network interconnecting said lines and said recall link circuit, means for individually assigning said channels to calling ones of said lines, means at each of said operator positions for controlling selected called lines to seize the channels assigned to calling ones of said lines to thereby complete connections between said calling and selected called lines, means for transmitting recall signals over said lines, means for scanning said channels for recall signals, means responsive to the detection of a recall signal on any one of said channels for controlling said recall link circuit to seize that channel, and means at each of said operator positions for performing an answering operation on said recall link circuit.

4. In a telephone system, a plurality of lines, an operator position, a plurality of link circuits, a recall link circuit, a multichannel transmission highway network interconnecting said lines, said link circuits, and said recall link circuit for the transmission of speech and supervisory signals therebetween, means for individually assigning said channels to calling ones of said lines, means for controlling said link circuits to individually seize the channels assigned to calling ones of said lines to thereby complete connections between said calling lines and said link circuits, means at said position for performing an answering operation on said link circuits on a one at a time basis, means for releasing each link circuit after an answering operation has been performed thereon to thereby free that link circuit for use on another call, means for scanning said channels for recall signals, and means responsive to the detection of a recall signal on any one of said channels for controlling said recall link circuit to seize that channel.

5. In a telephone system, a plurality of lines, a plurality of operator positions, a plurality of links circuits and a recall link circuit common to said positions, a multichannel transmission highway network interconnecting said lines, said link circuits, and said recall link circuit for the transmission of speech and supervisory signals therebetween, means for individually assigning said channels to calling ones of said lines, means for controlling said link circuits to individually seize the channels assigned to calling ones of said lines to thereby complete connections between said calling lines and said link circuits, means at each position for performing an answering operation on any one of said link circuits, means for releasing each link circuit after an answering operation has been performed thereon to thereby free that link circuit for use on another call, means for scanning said channels for recall signals, means responsive to the detection of a recall signal on any one of said channels for controlling said recall link circuit to seize that channel, means at each position for performing an answering operation on said recall link circuit, and means for releasing said recall link circuit after an answering operation has been performed thereon.

6. In a telephone system, a plurality of lines, an operator position, a plurality of link circuits, a recall link circuit, a multichannel transmission highway network interconnecting said lines, said link circuits, and said recall link circuit for the transmission of speech and supervisory signals therebetween, means for individually assigning said channels to calling ones of said lines, means for controlling said link circuits to individually seize the channels assigned to calling ones of said lines to thereby complete connections between said calling lines and said link circuits, means at said operator position for performing an answering operation on a link circuit enabled for seizure, means for enabling said link circuits for seizure one at a time in the same sequence that calls are completed between calling ones of said lines and said link circuits, means for releasing each link circuit after an answering operation has been performed thereon to thereby free that link circuit for use on another call, means for scanning said channels for recall signals, means responsive to the detection of a recall signal on any one of said channels for controlling said recall link circuit to seize that channel and for immediately enabling said recall link circuit for seizure, and means for giving said recall link circuit answering priority over any link circuit enabled for seizure.

7. In a telephone system of the type in which each calling line is assigned an individual time position which recurs in repetitive time position frames for the transmission of communication signals between that line and a common transmission highway network, an operator position, a plurality of link circuits, a recall link circuit, storage means in each link circuit for registering the time position designation of a calling line and for thereafter connecting that link circuit to the transmission network in that time position to thereby complete a connection between that calling line and that link circuit, means at said operator position for performing an answering operation on a link circuit enabled for seizure, means for enabling said link circuits for seizure one at a time in the same sequence that calls are completed between calling ones of said lines and said link circuits, means for releasing each link circuit after an answering operation has been performed thereon to thereby free that link circuit for use on another call, means for scanning said channels for recall signals, means responsive to the detection of a recall signal on any one of said channels for controlling said recall link circuit to seize that channel and for immediately enabling said recall link circuit for seizure, and means for giving said recall link circuit answering priority over any link circuit enabled for seizure.

8. In a telephone system of the type in which each calling line is assigned an individual time position which recurs in repetitive time position frames for the transmission of communication systems between that line and a common transmission highway network, a plurality of operator positions, a plurality of link circuits and a recall link circuit common to said operator positions, storage means in each link circuit for registering the time position designation of a calling line and for thereafter connecting that link circuit to the transmission network in that time position to thereby complete a connection between that calling line and that link circuit, means at each operator position for performing an answering operation on a link circuit enabled for seizure, means for enabling said link circuits for seizure one at a time in the same sequence that calls are completed between calling ones of said lines and said link circuits, means for releasing each link circuit after an answering operation has been performed thereon to thereby free that link circuit for use on another call, means for scanning said channels for recall signals, means responsive to the detection of a recall signal on any one of said channels for controlling said recall link circuit to seize that channel and for immediately enabling said recall link circuit for seizure, and means for giving said recall link circuit answering priority over any link circuit enabled for seizure.

9. In a telephone system, a plurality of lines, an operator position, a plurality of link circuits, a recall link circuit, a multichannel transmission highway network interconnecting said lines, said link circuits, and said recall link circuit for the transmission of speech and supervisory signals therebetween, means for individually assigning said channels to calling ones of said lines, means for controlling said link circuits to individually seize the channels assigned to calling ones of said lines to thereby complete connections between said calling lines and said link circuits, means for enabling link circuits having connections completed thereto for seizure by said operator position one at a time and in the same sequence as connections are completed thereto, an answer key at said operator position, means responsive to the operation of said key for seizing the link circuit enabled for seizure, means responsive to the restoration of said key for releasing the just answered link circuit to thereby free that link circuit for use on another call, means for scanning said channels for recall signals, means responsive to the detection of a recall signal on any one of said channels for controlling said recall link circuit to seize that channel and for immediately enabling said recall link circuit for seizure, and means responsive to the operation of said key when said recall link circuit is enabled for seizure for seizing said recall link circuit regardless of whether or not one of said link circuits is enabled for seizure at that time.

10. In a telephone system of the type in which each calling line is assigned an individual time position which recurs in repetitive time position frames for the transmission of communication signals between that line and a common transmission highway network, an operator position, a plurality of link circuits, a recall link circuit, storage means in each link circuit for registering the time position designation of a calling line and for thereafter connecting that link circuit to the transmission network in that time position to thereby complete a connection between that calling line and that link circuit, means for enabling said link circuits for seizure by said operator position one at a time and in the same sequence that calls are completed between calling ones of said lines and said link circuits, a single answer key at said operator position, means responsive to the operation of said key for seizing the link circuit enabled for seizure, means responsive to the restoration of said key for releasing the just answered link circuit to thereby free that link circuit for use on another call, means for scanning said channels for recall signals, means responsive to the detection of a recall signal on any one of said channels for controlling said recall link circuit to seize that channel and for immediately enabling said recall link circuit for seizure, and means responsive to the operation of said key when said recall link circuit is enabled for seizure for seizing said recall link circuit regardless of whether or not one of said link circuits is enabled for seizure at that time.

11. In a telephone system of the type in which each calling line is assigned an individual time position which recurs in repetitive time position frames for the transmission of communication signals between that line and a common transmission highway network, a plurality of operator positions, a plurality of link circuits and a recall link circuit common to said operator positions, storage means in each link circuit for registering the time position designation of a calling line and for thereafter connecting that link circuit to the transmission network in that time position to thereby complete a connection between that calling line and that link circuit, means for enabling said link circuits one at a time for seizure by any one of said operator positions and in the same sequence that calls are completed between calling ones of said lines and said link circuits, a single answer key at each of said operator positions, means responsive to the operation of the key at any one of said operator positions for seizing the link circuit enabled for seizure, means responsive to the restoration of the key for releasing the just answered link circuit to thereby free that link circuit for use on another call, means for scanning said channels for recall signals, means responsive to the detection of a recall signal on any one of said channels for controlling said recall link circuit to seize that channel and for immediately enabling said recall link circuit for seizure, and means responsive to the operation of the key at any one of said operator positions when said recall link circuit is enabled for seizure for seizing said recall link circuit regardless of whether or not one of said link circuits is enabled for seizure at that time.

12. In a telephone system, a plurality of lines, an operator position, a plurality of link circuits, a transmission highway network of the time division channel type interconnecting said lines and said link circuits for the transmission of speech and supervisory signals therebetween, means for individually assigning said channels to calling ones of said lines, means for controlling said link circuits to individually seize the channels assigned to calling ones of said lines to thereby complete connections between said calling lines and said link circuits, means for enabling said link circuits for connection to said operator position one at a time and in the same sequence that calls are completed between calling ones of said lines and said link circuits, a single answer key at said operator position, means responsive to the operation of said key for connecting the link circuit enabled for connection to said operator position, means effective only while said key is operated for controlling a selected called line to seize the channel assigned to the calling line associated with the answered link circuit, and means responsive to the restoration of said key for releasing the just answered link circuit to thereby free that link circuit for use on another call.

13. In a telephone system, a plurality of lines, a plurality of operator positions, a plurality of link circuits common to said operator positions, a transmission highway network of the time division channel type interconnecting said lines and said link circuits for the transmission of speech and supervisory signals therebetween, means for individually assigning said channels to calling ones of said lines, means for controlling said link circuits to individually seize the channels assigned to calling ones of said lines to thereby complete connections between said calling lines and said link circuits, means for enabling said link circuits one at a time for connection to any one of said operator positions and in the same sequence that connections are completed between calling ones of said lines and said link circuits, a single answer key at each of said operator positions, means responsive to the operation of the key at any one of said operator positions for connecting the link circuit enabled for connection to that operator position, means effective while the key at an operator position is operated for controlling a selected called line to seize the channel assigned to the calling line associated with the link circuit connected to that operator position, and means responsive to the restoration of the key at an operator position for releasing the just answered link circuit to thereby free that link circuit for use on another call.

14. In a telephone system, a plurality of lines, a register, an operator position, a plurality of operator link circuits, a multichannel transmission network interconnecting said lines, said register, and said link circuits, means for controlling a calling one of said lines and said register to seize one of said channels for the transmittal of called line selecting information between said one line and said register, a route selector, a conductor interconnecting said selector and said link circuits, means in said register for controlling said selector to apply a potential to said conductor when the call being processed is to be routed to said operator position, an incoming distributor for assigning said link circuits for use in turn, means in said register for transmitting a marking signal identifying said one channel to said link circuits, means effective only in the assigned link circuit and responsive to the application of potential to said conductor for seizing the channel identified by said marking signal to thereby complete a connection between said one calling line and that link circuit, means at said operator position for performing an answering operation on a link circuit enabled for seizure, and means for enabling said link circuits for seizure one at a time and in the same sequence that calls are completed between calling ones of said lines and said link circuits.

15. In a telephone system, a plurality of lines, a register, an operator position, a plurality of link circuits, a recall link circuit, a multichannel transmission network interconnecting said lines, said register, said link circuits, and said recall link circuit, means for controlling a calling one of said lines and said register to seize one of said channels for the transmittal of called line selecting information between said one line and said register, a route selector, a conductor interconnecting said selector and said link circuits, means in said register for controlling said selector to apply a potential to said conductor when the call being processed is to be routed to said operator position, an incoming distributor for assigning said link circuits for use in turn, means in said register for transmitting a marking signal identifying said one channel to said link circuits, means effective only in the assigned link circuit and responsive to the application of potential to said conductor for seizing the channel identified by said marking signal to thereby complete a connection between said one calling line and that link circuit, means at said operator position for performing an answering operation on link circuits enabled for seizure, means for enabling said link circuits for seizure one at a time and in the same sequence that calls are completed between calling lines and said link circuits, means for releasing each link circuit after an answering operation has been performed thereon to thereby free that link circuit for use on another call, means for scanning said channels for recall signals, means responsive to the detection of a recall signal on any one of said channels for controlling said recall link circuit to seize that channel and for immediately enabling said recall link circuit for seizure, and means for giving said recall link circuit answering priority over any link circuit enabled for seizure.

No references cited.